United States Patent
Schwartz et al.

(10) Patent No.: US 7,205,262 B2
(45) Date of Patent: Apr. 17, 2007

(54) FRICTION REDUCING COMPOSITION AND METHOD

(75) Inventors: Kevin N Schwartz, Mt. Lebanon, PA (US); Kevin W. Smith, McMurray, PA (US)

(73) Assignee: Weatherford/Lamb, Inc., Houston, TX (US)

( * ) Notice: Subject to any disclaimer, the term of this patent is extended or adjusted under 35 U.S.C. 154(b) by 115 days.

(21) Appl. No.: 10/315,374

(22) Filed: Dec. 10, 2002

(65) Prior Publication Data

US 2003/0125215 A1 Jul. 3, 2003

Related U.S. Application Data

(63) Continuation-in-part of application No. 10/228,875, filed on Aug. 27, 2002.

(60) Provisional application No. 60/339,630, filed on Dec. 12, 2001.

(51) Int. Cl.
*C09K 8/00* (2006.01)

(52) U.S. Cl. .......... 507/90; 507/922; 507/924; 507/261; 507/266; 507/222; 507/259; 137/13; 166/308.2

(58) Field of Classification Search ........... 137/13; 507/90, 922, 924, 261, 266, 222, 259; 524/916; 526/930; 516/99, 102, 104; 166/308.2
See application file for complete search history.

(56) References Cited

U.S. PATENT DOCUMENTS

| | | | |
|---|---|---|---|
| 2,074,047 A | 3/1937 | Dechant | |
| 3,018,695 A | 1/1962 | George | |
| 3,292,698 A | 12/1966 | Savins | |
| 3,361,213 A | 1/1968 | Savins | |
| 3,373,107 A | 3/1968 | Rice et al. | |
| 3,406,115 A | 10/1968 | White | |
| 3,562,226 A | 2/1971 | Gayley et al. | |
| 3,578,871 A | 5/1971 | Sakamoto | |
| 3,604,508 A | 9/1971 | Son, Jr. | |
| 3,654,994 A | 4/1972 | Slagel et al. | 166/308 |
| 3,760,881 A | 9/1973 | Kiel | |
| 3,768,565 A | 10/1973 | Persinski et al. | |

(Continued)

FOREIGN PATENT DOCUMENTS

AU 200221299 A1 5/2005

(Continued)

OTHER PUBLICATIONS

SPE 30114; Use of a Solids-free Viscous Carrying Fluid in Fracturing Applications: An Economic and Productivity Comparison in Shallow Completions; B.R. Stewart, et al; Copyright 1994; Society of Petroleum Engineers, Inc.; May 15-16, 1995—European Formation Damage Control Conference, The Hague, The Netherlands.

(Continued)

*Primary Examiner*—Philip C. Tucker
(74) *Attorney, Agent, or Firm*—Patterson & Sheridan, L.L.P.

(57) ABSTRACT

Water soluble nonionic friction reducers and added to coacervate gels having excellent shear viscosities and other properties. A preferred gel comprises poly diallyl dimethyl ammonium chloride, a lesser amount of sodium lauryl sulfonate, and lauryl alcohol. Excellent friction reducing properties are manifested; a particularly practical use for the compositions is in subterranean formation fracturing.

31 Claims, 8 Drawing Sheets

Zeta potential vs. 0.5% Sodium Lauryl Sulfate & pDADMAC Agefloc Coacervate

U.S. PATENT DOCUMENTS

| | | | |
|---|---|---|---|
| 3,779,969 A | 12/1973 | Clayton et al. | 260/29.6 |
| 3,849,348 A | 11/1974 | Hewitt | |
| 3,868,328 A | 2/1975 | Boothe et al. | 252/8.55 |
| 3,892,252 A | 7/1975 | Poettmann | |
| 3,920,599 A | 11/1975 | Hurlock et al. | |
| 3,937,283 A | 2/1976 | Blauer et al. | |
| 3,943,060 A | 3/1976 | Martin et al. | 252/8.55 |
| 3,954,627 A | 5/1976 | Dreher et al. | |
| 4,007,792 A | 2/1977 | Meister | |
| 4,049,608 A | 9/1977 | Steckler et al. | |
| 4,061,580 A | 12/1977 | Jahnke | |
| 4,064,091 A | 12/1977 | Samour et al. | |
| 4,071,457 A | 1/1978 | Meister | |
| 4,108,782 A | 8/1978 | Thompson | |
| 4,113,631 A | 9/1978 | Thompson | |
| 4,120,356 A | 10/1978 | Meister | |
| 4,148,736 A | 4/1979 | Meister | |
| 4,153,066 A | 5/1979 | Griffin, Jr. | 137/13 |
| 4,182,417 A | 1/1980 | McDonald et al. | 166/295 |
| 4,192,753 A | 3/1980 | Pye et al. | |
| 4,282,928 A | 8/1981 | McDonald et al. | 166/274 |
| 4,324,669 A | 4/1982 | Norman et al. | |
| 4,337,185 A | 6/1982 | Wessling et al. | |
| 4,341,684 A * | 7/1982 | Krantz | 523/175 |
| 4,360,061 A | 11/1982 | Canter et al. | |
| 4,409,110 A | 10/1983 | Borchardt et al. | |
| 4,412,586 A | 11/1983 | Sifferman | |
| 4,416,297 A | 11/1983 | Wolfram et al. | |
| 4,418,755 A | 12/1983 | Sifferman | |
| 4,432,881 A | 2/1984 | Evani | 252/8.5 |
| 4,438,045 A | 3/1984 | Neih et al. | |
| 4,458,757 A | 7/1984 | Bock et al. | |
| 4,465,801 A | 8/1984 | Peiffer et al. | |
| 4,469,873 A | 9/1984 | Nieh | |
| 4,507,210 A | 3/1985 | Lauzon | |
| 4,517,351 A | 5/1985 | Szymanski et al. | |
| 4,534,875 A | 8/1985 | Rose | |
| 4,569,799 A | 2/1986 | House | |
| 4,579,667 A | 4/1986 | Echt et al. | |
| 4,579,670 A | 4/1986 | Payne | |
| 4,591,447 A | 5/1986 | Kubala | |
| 4,604,217 A | 8/1986 | Lukach et al. | 252/8.55 |
| 4,615,825 A | 10/1986 | Teot et al. | |
| 4,617,132 A | 10/1986 | Dalrymple et al. | |
| 4,637,883 A | 1/1987 | Patel et al. | |
| 4,646,834 A | 3/1987 | Bannister | |
| 4,653,584 A | 3/1987 | Ball et al. | |
| 4,662,444 A | 5/1987 | Yang | |
| 4,681,165 A | 7/1987 | Bannister | |
| 4,695,389 A | 9/1987 | Kubala | |
| 4,702,848 A | 10/1987 | Payne | |
| 4,707,306 A | 11/1987 | Leighton et al. | |
| 4,710,586 A | 12/1987 | Patel et al. | |
| 4,725,372 A | 2/1988 | Teot et al. | |
| 4,728,696 A | 3/1988 | Van Phung et al. | 526/304 |
| 4,735,731 A | 4/1988 | Rose et al. | |
| 4,737,296 A | 4/1988 | Watkins | |
| 4,743,384 A | 5/1988 | Lu et al. | |
| 4,770,814 A | 9/1988 | Rose et al. | |
| 4,778,865 A | 10/1988 | Leighton et al. | |
| 4,779,680 A | 10/1988 | Sydansk | |
| 4,790,958 A | 12/1988 | Teot | |
| 4,796,702 A | 1/1989 | Scherubel | |
| 4,806,256 A | 2/1989 | Rose et al. | |
| 4,831,092 A | 5/1989 | Bock et al. | |
| 4,834,182 A | 5/1989 | Shu | |
| 4,852,652 A | 8/1989 | Kuehne | |
| 4,880,565 A | 11/1989 | Rose et al. | |
| 4,910,248 A | 3/1990 | Peiffer | |
| 4,911,241 A | 3/1990 | Williamson et al. | |
| 4,948,576 A | 8/1990 | Verdicchio et al. | |
| 4,975,482 A | 12/1990 | Peiffer | |
| 4,983,186 A * | 1/1991 | Naiman et al. | 44/394 |
| 4,988,450 A | 1/1991 | Wingrave et al. | |
| 5,036,136 A | 7/1991 | Peiffer | |
| 5,049,383 A | 9/1991 | Huth et al. | |
| 5,062,969 A | 11/1991 | Holtmyer et al. | |
| 5,093,448 A | 3/1992 | Peiffer | |
| 5,101,903 A | 4/1992 | Llave et al. | |
| 5,105,884 A | 4/1992 | Sydansk | |
| 5,125,456 A | 6/1992 | Hutchins et al. | |
| 5,129,457 A | 7/1992 | Sydansk | |
| 5,137,715 A | 8/1992 | Hoshowski et al. | |
| 5,159,979 A | 11/1992 | Jennings, Jr. | |
| 5,162,475 A | 11/1992 | Tang et al. | |
| 5,169,441 A | 12/1992 | Lauzon | |
| 5,203,411 A | 4/1993 | Dawe et al. | |
| 5,246,072 A | 9/1993 | Frazier, Jr. et al. | |
| 5,258,137 A | 11/1993 | Bonekamp et al. | |
| 5,276,248 A | 1/1994 | Engelhardt et al. | |
| 5,310,002 A | 5/1994 | Blauch et al. | |
| 5,350,528 A | 9/1994 | Westland et al. | |
| 5,362,827 A | 11/1994 | Bock | |
| 5,439,059 A | 8/1995 | Harris et al. | |
| 5,462,689 A | 10/1995 | Choy et al. | |
| 5,547,026 A | 8/1996 | Brannon et al. | |
| 5,551,516 A | 9/1996 | Norman et al. | |
| 5,562,866 A | 10/1996 | Hu et al. | |
| 5,566,760 A | 10/1996 | Harris | |
| 5,587,356 A | 12/1996 | Dauderman et al. | |
| 5,591,701 A | 1/1997 | Thomas | |
| 5,597,783 A | 1/1997 | Audibert et al. | |
| 5,607,904 A | 3/1997 | Jarrett | |
| 5,637,556 A | 6/1997 | Argillier et al. | |
| 5,652,200 A | 7/1997 | Davies et al. | |
| 5,670,460 A | 9/1997 | Neely et al. | |
| 5,679,877 A | 10/1997 | Erilli et al. | |
| 5,701,955 A | 12/1997 | Frampton | |
| 5,705,467 A | 1/1998 | Choy | |
| 5,706,895 A | 1/1998 | Sydansk | |
| 5,707,955 A | 1/1998 | Gomes et al. | |
| 5,711,376 A | 1/1998 | Sydansk | |
| 5,728,654 A | 3/1998 | Dobson, Jr. et al. | |
| 5,735,349 A | 4/1998 | Dawson et al. | |
| 5,741,757 A | 4/1998 | Cooper et al. | |
| 5,767,050 A | 6/1998 | Adamy et al. | |
| 5,785,747 A | 7/1998 | Vollmer et al. | |
| 5,846,308 A | 12/1998 | Lauzon | 106/218 |
| 5,964,295 A | 10/1999 | Brown et al. | |
| 5,964,692 A * | 10/1999 | Blezard et al. | 516/59 |
| 5,965,502 A | 10/1999 | Balzer | 510/158 |
| 5,979,555 A | 11/1999 | Gadberry et al. | |
| 6,011,075 A | 1/2000 | Parris et al. | |
| 6,020,289 A | 2/2000 | Dymond | |
| 6,035,936 A | 3/2000 | Whalen | |
| 6,063,737 A | 5/2000 | Haberman et al. | |
| 6,068,056 A | 5/2000 | Frenier et al. | |
| 6,069,118 A | 5/2000 | Hinkel et al. | |
| 6,076,046 A | 6/2000 | Vasudevan et al. | |
| 6,100,222 A | 8/2000 | Vollmer et al. | |
| 6,103,153 A | 8/2000 | Park et al. | 264/45.7 |
| 6,106,700 A | 8/2000 | Collins et al. | |
| 6,110,451 A | 8/2000 | Matz et al. | |
| 6,140,277 A | 10/2000 | Tibbles et al. | |
| 6,143,709 A | 11/2000 | Carey | |
| 6,156,805 A | 12/2000 | Smith et al. | |
| 6,169,058 B1 | 1/2001 | Le et al. | |
| 6,178,980 B1 * | 1/2001 | Storm | 137/13 |
| 6,192,985 B1 | 2/2001 | Hinkel et al. | |
| 6,194,354 B1 | 2/2001 | Hatchman | |
| 6,194,356 B1 | 2/2001 | Jones et al. | |
| 6,221,817 B1 | 4/2001 | Guskey et al. | |
| 6,227,295 B1 | 5/2001 | Mitchell et al. | |
| 6,230,805 B1 | 5/2001 | Vercaemer et al. | |

| | | | | | | |
|---|---|---|---|---|---|---|
| 6,232,274 | B1 | 5/2001 | Hughes et al. | EP | 0 280 341 | | 8/1988 |
| 6,239,183 | B1 | 5/2001 | Farmer et al. | EP | 0 474 284 | A1 | 3/1992 |
| 6,248,317 | B1 | 6/2001 | Snyder et al. | EP | 0 474 284 | B1 | 3/1992 |
| 6,258,859 | B1 | 7/2001 | Dahayanake et al. | EP | 0 681 016 | A1 | 11/1995 |
| 6,268,314 | B1 | 7/2001 | Hughes et al. | EP | 0 681 016 | B1 | 11/1995 |
| 6,279,656 | B1 | 8/2001 | Sinclair et al. | EP | 0 835 983 | A2 | 4/1998 |
| 6,281,180 | B1 | 8/2001 | Tartakovsky et al. | EP | 0 835 983 | A3 | 3/1999 |
| 6,283,212 | B1 | 9/2001 | Hinkel et al. | EP | 0 681 017 | B1 | 12/1999 |
| 6,284,230 | B1 | 9/2001 | Sako et al. | EP | 1 042 425 | B1 | 11/2002 |
| 6,291,406 | B1 | 9/2001 | Rose et al. | EP | 1 273 756 | A1 | 1/2003 |
| 6,297,203 | B1 | 10/2001 | Guskey et al. | EP | 1 051 452 | B1 | 3/2003 |
| 6,302,209 | B1 | 10/2001 | Thompson et al. | EP | 1 323 888 | A1 | 7/2003 |
| 6,305,470 | B1 | 10/2001 | Woie | EP | 0 993 334 | B1 | 8/2003 |
| 6,306,800 | B1 | 10/2001 | Samuel et al. | WO | WO 96/07710 | | 3/1996 |
| 6,315,824 | B1 | 11/2001 | Lauzon ............... 106/287.2 | WO | WO 97/26310 | | 7/1997 |
| 6,350,721 | B1 | 2/2002 | Fu et al. | WO | WO 97/26311 | | 7/1997 |
| 6,359,040 | B1 | 3/2002 | Burdick | WO | WO 98/56497 | | 12/1998 |
| 6,399,546 | B1 | 6/2002 | Chang et al. | WO | WO 99/32572 | | 7/1999 |
| 6,399,547 | B1 | 6/2002 | Frenier et al. | WO | WO 99/38931 | | 8/1999 |
| 6,403,537 | B1 | 6/2002 | Chesser et al. | WO | WO 99/50529 | | 10/1999 |
| 6,410,489 | B1 | 6/2002 | Zhang et al. | WO | WO 99/50530 | | 10/1999 |
| 6,417,268 | B1 | 7/2002 | Zhang et al. | WO | WO 00/32711 | | 6/2000 |
| 6,432,885 | B1 | 8/2002 | Vollmer | WO | WO 00/39241 | | 7/2000 |
| 6,433,075 | B1 | 8/2002 | Davies et al. | WO | WO 00/40667 | | 7/2000 |
| 6,446,727 | B1 | 9/2002 | Zemlak et al. | WO | WO 00/65196 | A1 | 11/2000 |
| 6,468,945 | B1 | 10/2002 | Zhang | WO | WO 00/78890 | A1 | 12/2000 |
| 6,474,413 | B1 | 11/2002 | Barbosa et al. | WO | WO 01/23703 | A1 | 4/2001 |
| 6,482,866 | B1 | 11/2002 | Dahayanke et al. | WO | WO 01/23801 | A1 | 4/2001 |
| 6,488,091 | B1 | 12/2002 | Weaver et al. | WO | WO 01/29369 | | 4/2001 |
| 6,489,270 | B1 | 12/2002 | Vollmer et al. | WO | WO 01/51767 | A2 | 7/2001 |
| 6,491,099 | B1 | 12/2002 | Di Lullo Arias et al. | WO | WO 01/51767 | A3 | 7/2001 |
| 6,506,710 | B1 | 1/2003 | Hoey et al. | WO | WO 01/63090 | A2 | 8/2001 |
| 6,508,307 | B1 | 1/2003 | Almaguer | WO | WO 01/63090 | A3 | 8/2001 |
| 6,509,300 | B1 | 1/2003 | Gupta | WO | WO 01/64809 | A1 | 9/2001 |
| 6,509,301 | B1 | 1/2003 | Vollmer | WO | WO 01/77487 | | 10/2001 |
| 6,534,449 | B1 | 3/2003 | Gilmour et al. | WO | WO 01/77487 | A2 | 10/2001 |
| 6,569,814 | B1 | 5/2003 | Brady et al. | WO | WO 01/77487 | A3 | 10/2001 |
| 6,573,305 | B1 | 6/2003 | Thunhorst et al. | WO | WO 01/81499 | | 11/2001 |
| 6,575,242 | B2 | 6/2003 | Woie | WO | WO 01/81499 | A2 | 11/2001 |
| 6,579,947 | B2 | 6/2003 | Heitz et al. | WO | WO 01/81499 | A3 | 11/2001 |
| 6,586,371 | B1 | 7/2003 | Maroy et al. | WO | WO 01/83946 | | 11/2001 |
| 6,605,570 | B2 | 8/2003 | Miller et al. | WO | WO 01/83946 | A1 | 11/2001 |
| 6,719,053 | B2 | 4/2004 | Thompson | WO | WO 01/94742 | A1 | 12/2001 |
| 2002/0002205 | A1 | 1/2002 | Dahayanake et al. | WO | WO 02/11873 | A1 | 2/2002 |
| 2002/0004464 | A1 | 1/2002 | Nelson et al. | WO | WO 02/11874 | A1 | 2/2002 |
| 2002/0033260 | A1 | 3/2002 | Lungwitz et al. | WO | WO 02/12673 | A1 | 2/2002 |
| 2002/0125012 | A1 | 9/2002 | Dawson et al. | WO | WO 02/24771 | A2 | 3/2002 |
| 2002/0132741 | A1 | 9/2002 | Chang et al. | WO | WO 02/24771 | A3 | 3/2002 |
| 2002/0147114 | A1 | 10/2002 | Dobson, Sr. et al. | WO | WO 02/24831 | A2 | 3/2002 |
| 2002/0185278 | A1 | 12/2002 | Brown et al. | WO | WO 02/25058 | A1 | 3/2002 |
| 2002/0189810 | A1 | 12/2002 | DiLullo et al. | WO | WO 02/055843 | A1 | 7/2002 |
| 2002/0193257 | A1 | 12/2002 | Lee et al. | WO | WO 02/064946 | A1 | 8/2002 |
| 2003/0008781 | A1 | 1/2003 | Gupta et al. | WO | WO 02/064947 | A1 | 8/2002 |
| 2003/0008803 | A1 | 1/2003 | Nilsson et al. | WO | WO 02/066790 | A1 | 8/2002 |
| 2003/0019627 | A1 | 1/2003 | Qu et al. | WO | WO 02/070862 | A1 | 9/2002 |
| 2003/0040441 | A1 | 2/2003 | Miller et al. | WO | WO 02/088520 | A1 | 11/2002 |
| 2003/0040546 | A1 | 2/2003 | Dahayanake et al. | WO | WO 03/015523 | A2 | 2/2003 |
| 2003/0057401 | A1 | 3/2003 | Craig | WO | WO 03/018695 | A1 | 3/2003 |
| 2003/0073585 | A1 | 4/2003 | Di Lullo Arias et al. | WO | WO 03/048267 | A1 | 6/2003 |
| 2003/0119680 | A1 | 6/2003 | Chang et al. | WO | WO 03/050387 | | 6/2003 |
| 2003/0130133 | A1 | 7/2003 | Vollmer | WO | WO 03/054352 | A1 | 7/2003 |
| 2003/0134751 | A1 | 7/2003 | Lee et al. | WO | WO 03/056130 | A1 | 7/2003 |
| 2003/0139298 | A1 | 7/2003 | Fu et al. | | | | |
| 2004/0082668 | A1* | 4/2004 | Vinson ............... 516/38 | | | | |
| 2004/0142825 | A1 | 7/2004 | Jovancicevic et al. | | | | |
| 2004/0220063 | A1* | 11/2004 | Chappell et al. ........... 510/130 | | | | |

FOREIGN PATENT DOCUMENTS

| | | |
|---|---|---|
| CA | 1185779 | 4/1985 |
| CA | 2257697 | 12/1998 |
| CA | 2257699 | 6/2000 |
| CA | 2239600 | 6/2002 |

OTHER PUBLICATIONS

SPE 31114; Use of a Viscoelastic Carrier Fluid in Frac-Pack Applications; J. Ernest Brown, et al; Copyright 1996; Society of Petroleum Engineers, Inc. ; Feb. 14-15, 1996—SPE Formation Damage Symposium, Lafayette, La., U.S.A.

SPE 26559; Fluid Selection for Fracturing High-Permeability Formations; J. M. McGowen, et al; Copyright 1993, Society of Petroleum Engineers, Inc.; Oct. 3-6, 1993—68th Annual T3echnical Conference and Exhibition of the Society of Petroleum Engineers, Houston, Texas, U.S.A.

SPE 27361; Productivity Comparison of Sand Control Techniques Used for Completions in the Vermillion 331 Field; M.E. Mullen, et al; Copyright 1994, Society of Petroleum Engineers, Inc., Feb. 7-10, 1994—SPE Intl. Symposium on Formation Damage Control, Lafayette, La., U.S.A.

SPE 23805; Hydraulic Fracturing of Soft Formations in the Gulf Coast; J.A. Ayoub, et al; Copyright 1992, Society of Petroleum Engineers, Inc.; Feb. 26-27, 1992—Formation Damage Control Symposium, Lafayette La., U.S.A.

SPE 17168; Visceolastic Gravel-Pack Carrier Fluid; W. L. Nehmer, et al; Copyright 1988, Society of Petroleum Engineers; Feb. 8-9, 1988. SPE Formation Damage Control Symposium, Bakersfield, California, U.S.A.

PCT International Search Report, International Application No. PCT/GB 02/05638, dated Jun. 11, 2003.

U.K. Search Report, Application No. GB0328654.9, dated May 24, 2004.

* cited by examiner

Zeta potential vs. 0.5% Sodium Lauryl Sulfate & pDADMAC Agefloc Coacervate

Zeta potential vs. pH of 1/2 Zeta gel (1.3% pDADMAC & 0.5% SLS)

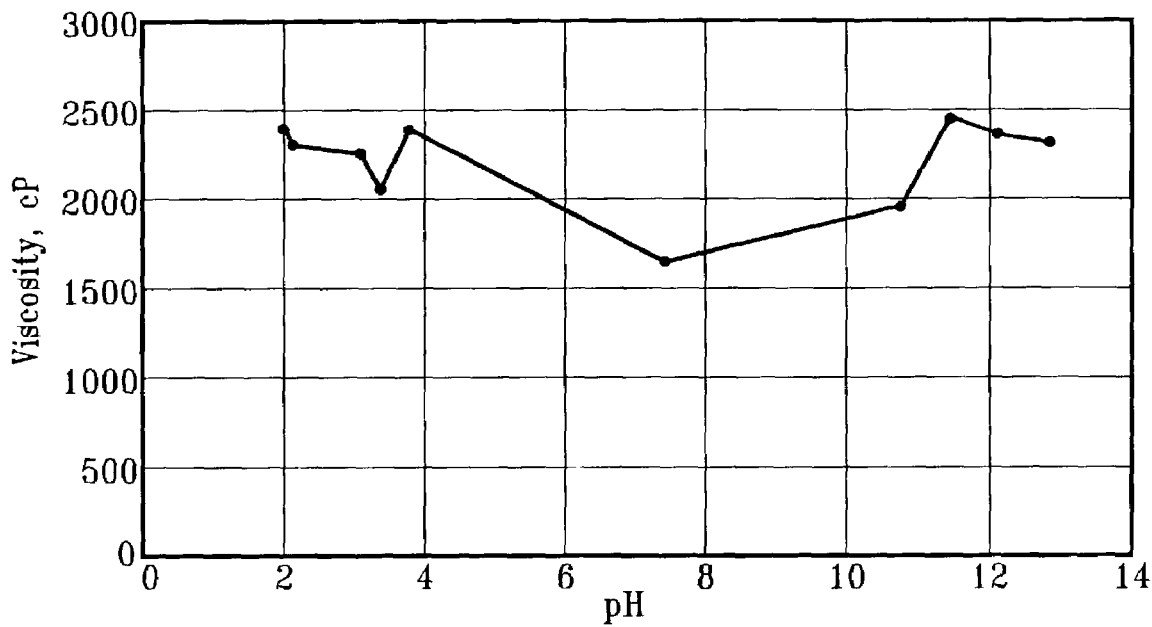
Viscosity vs. pH on 1/2 Zeta gel
(1.3% pDADMAC (WSP) & 0.5% SLS)
(Brookfield DVII+ viscometer setting
with the LV spindle on #4 @ 100 RPM)   Fig.3
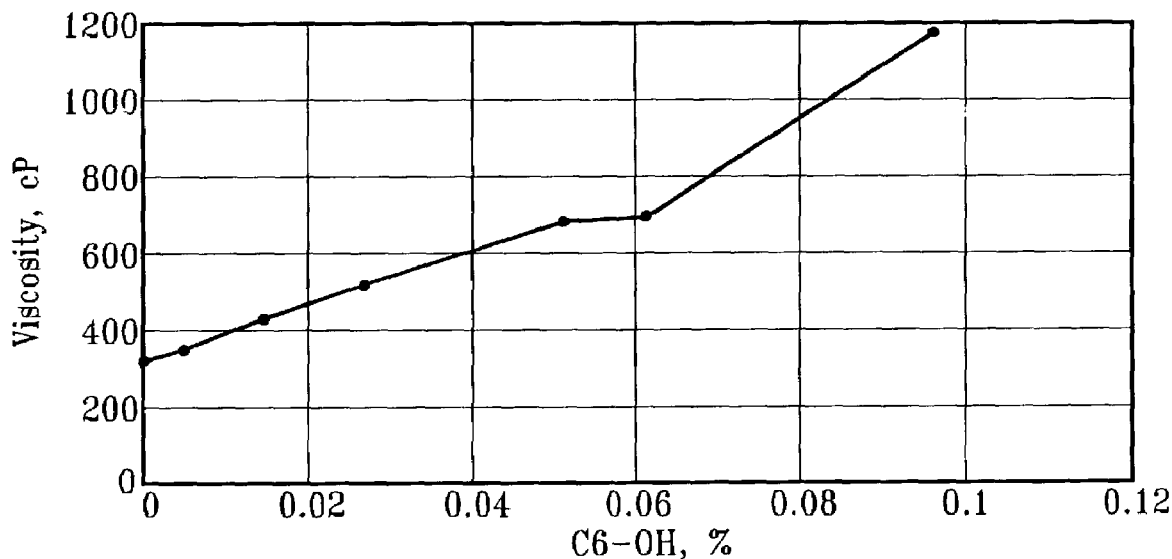
Viscosity vs. Hexanol conc. in 1/2 Zeta gel
(1.3% pDADMAC & 0.5% SLS)
(Brookfield DVII+ viscometer setting
with the LV spindle on #3 @ 100 RPM)   Fig.4

1/2 zeta gel using 1.3% active pDADMAC
and 0.5% sodium lauryl sulfate
(Brookfield DVII+ viscometer setting
with the LV spindle on #3 @ 100 RPM)

Viscosity vs. Lauryl Alcohol conc. in 1/2 zeta gel
1/2 Zeta gel = 6.5% agefloc 20vhv and
0.5% SLS (70% aldrich grade)
(Brookfield viscometer setting
with the LV spindle on 6,4 @ 50 RPM)

Viscosity vs. Cocoamidyl Propyl Betaine conc.
in 1/2 Zeta gel
1/2 Zeta gel is 1.3% pDADMAC and 0.5% SLS
(Brookfield viscometer spindle 6,4 @ 50 RPM)

Viscosity vs. Lauryl Amine Oxide conc.
in 1/2 Zeta gel (Zeta gel = 1.3% pDADMAC and 0.5% SLS)
(Brookfield RV viscometer setting
with the LV spindle on #4)

Viscosity vs. Time on Fann 50 @ 160F
using 1/4 zeta gel with 3 additives
using Ciba star 1800 pDADMAC
(viscometer @ 100 RPM and 300 RPM)

120F - 1/4 zeta gel w/3 additives
using star1800 pDADMAC

FRICTION REDUCING COMPOSITION AND METHOD

RELATED APPLICATION

This application claims the full benefit of Provisional application 60/339,630 filed Dec. 12, 2001, and is a continuation-in-part of application Ser. No. 10/228,875, filed Aug. 27, 2002.

TECHNICAL FIELD

Micellar combinations of cationic or anionic polymers and oppositely charged surfactants are made preferably with C6–23 alcohols in proportions coordinated in aqueous media with the aid of Zeta Potential measurements. The resulting gels are useful in drilling and formation fracturing in hydrocarbon recovery, manifesting excellent proppant suspending properties in low concentrations of polymer and surfactant as compared to the prior art.

BACKGROUND OF THE INVENTION

In U.S. Pat. No. 5,169,441, Lauzon suggests the use of Zeta Potential for characterizing particulates such as pigments treated with cationic polymers. Lauzon's U.S. Pat. 5,846,308 describes the stabilization of a rosin dispersion for use as a sizing composition by treating it with a "cationic colloidal coacervate" which may include both a cationic polymer and an anionic surfactant; the finished sizing composition is to have a Zeta Potential of at least 20 millivolts. Poly(diallyldimethyl ammonium chloride), sometimes known as polyDADMAC, is the preferred cationic polymer. Also, Lauzon's U.S. Pat. No. 6,315,824 describes a similar coacervate stabilizing system used for hydrophobic non-rosin sizing agents, which may be liquid as well as solid. See also Lauzon's U.S. Pat. No. 4,507,210, which suggests a correlation of Zeta Potential to certain filtration properties in the treatment of shale and clay in hydrocarbon recovery; see also Engelmann et al in U.S. Pat. No. 5,196,401.

Other compositions comprising a cationic polymer and an anionic surfactant, often in high ratios of anionic surfactant to cationic polymer, may be found in Matz and LeMar U.S. Pat. No. 6,110,451, Verdicchio and Spilatro U.S. Pat. No. 4,948,576, and the shampoo and other personal care products described by Guskey et al in U.S. Pat. Nos. 6,297,203 and 6,221,817, Sako et al in U.S. Pat. No. 6,284,230, (which also describes betaines) Hoshowski et al in U.S. Pat. No. 5,137,715, and Snyder et al in U.S. Pat. No. 6,248,317.

Combinations of cationic polymers, betaines, and anionic surfactants may be inferred from the numerous combinations of materials that are possibly viscoelastic within the disclosure of Balzer in U.S. Pat. No. 5,956,502, dealing with compositions for use on the hair and skin. See also the combination of cationic polymer with anionic surfactants for use as an automatic dishwashing detergent, in Tartakovsky et al U.S. Pat. No. 6,281,180.

In the field of hydrocarbon recovery from the earth, formation fracturing fluids proposed by Zhang in Canadian patent 2,257,699 combine anionic surfactants such as sodium xylene sulfonate and cationic surfactants such as N, N, N, trimethyl-1-octadecammonium chloride to make a gel said to be viscoelastic. Carbon dioxide is added to similar combinations in Zhang's Canadian patent 2,257,697 to generate a foam. Borchardt et al, in U.S. Pat. No. 4,409,110, describe formation flooding compositions which may comprise cationic polymers and anionic surfactants. Numerous combinations of surfactants and other compounds are proposed by Dahayanake et al in U.S. Pat. No. 6,258,859 (WO 98/56497; PCT/US/12067). See also the compositions said to be viscoelastic and proposed for well treatment by Hughes et al in U.S. Pat. No. 6,232,274 and Jones et al in U.S. Pat. No. 6,194,356.

Also in the art of producing oil and gas from underground formations, it is known to add friction reducing compositions to the fracturing fluids, to conserve energy. As summarized in Persinski et al U.S. Pat. No. 3,768,565, "it is necessary to inject sufficient amounts of fracturing fluids . . . in order to effectuate cracks or fractures in the subterranean formation. Pressures as high as 3000 to 10000 psi measured at the surface are often required. Because of the large quantities of fluid needed, the high velocities required, and the general irregularities of the formation, it is difficult to obtain satisfactory results in many fracturing operations because of the energy loss." Column 1, lines 44–55. See also column 1, lines 14–32: "It is well known that in the movement of aqueous fluids through conduits, friction is encountered and hence energy is lost. This energy loss is apparent from the pressure drop obtained in moving the fluid through a given distance and is directly proportional to the velocity of the fluid. According to the well-known laws of fluid dynamics, as long as the critical Reynolds Number of a fluid medium flowing through a conduit is not exceeded, the fluid moves in laminae which are actually aligned along the conduit. Under these conditions of laminar flow, the energy loss is minimal. However, when the velocity is greatly increased, the critical Reynolds Number is exceeded and turbulence occurs. This turbulence represents the change from laminar to nonlaminar flow. In addition, turbulence is increased by any irregularities in the conduit or in the entering or exiting formation which will distort the flow pattern. An increase in turbulence causes an increase in the amount of energy lost through friction." Since these summaries were written in 1971, oil and gas production conditions and demands have further heightened the requirements for friction reducing additives for fracturing fluids. Various water-soluble polymers are suggested for friction reducing in the Persinski patent as well as several others cited in it. The reader may also be interested in the polymers used by Boothe et al in U.S. Pat. No. 3,868,328, Martin et al U.S. Pat. No. 3,943,060, Gayley et al U.S. Pat. No. 3,562,226, McClaflin et al U.S. Pat. No. 3,730,275, Griffin U.S. Pat. No. 4,153,066, McDonald et al U.S. Pat. No. 4,182,417, Teot et al U.S. Pat. No. 4,615,825, Karl U.S. Pat. No. 4,637,418, and Seheult et al U.S. Pat. No. 4,717,488.

Many of the materials used in the past for friction reduction require economically unattractive concentrations. Others are unattractive for various purposes because of their chemical reactivity. There remains a need for friction reducing materials which may be used at lower concentrations.

SUMMARY OF THE INVENTION

The entire specification, including description, claims, and drawings, of provisional application 60/339,630 filed Dec. 12, 2001 entitled "Cationic Polymeric Coacervates," is hereby incorporated by reference. Our invention includes aqueous gels, gel-forming compositions, methods of making them, and their use in well treatment. This continuation-in-part application also incorporates the entire specification of application Ser. No. 10/228,875 filed Aug. 27, 2002 which describes a polymeric gel system.

In its most basic form, our novel composition comprises (a) a cationic or anionic polymer and (b) a lesser amount of an oppositely charged surfactant, in a ratio to provide a Zeta Potential of 20 millivolts or higher, or −20 millivolts or lower, and (c) a small amount of a hydrophobic alcohol having 6 to 23 carbon atoms. The composition will preferably also include a small amount of a gel promoter comprising one or more of (d) an amphoteric surfactant and/or (e) an amine oxide surfactant, while maintaining the same limits of Zeta Potential. We may call our composition a polymer coacervate because the viscosifying properties of the polymer are controlled in coacervate form—that is, the long chain cationic or anionic polymer and the smaller amount of oppositely charged surfactant act in the presence of the hydrophobic alcohol to form a singular phase distinguished by a characteristic Zeta Potential. This singular phase, under the prescribed Zeta Potential, is capable of imparting a significantly increased viscosity compared to other solutions of the same polymer at the same concentration, including such concentrations in the presence of higher and lower amounts of the same other additives or components.

The surfactant which is oppositely charged from the polymer is sometimes called herein the "counterionic surfactant." By this we mean a surfactant having a charge opposite that of the polymer.

Suitable cationic polymers include polyamines, quaternary derivatives of cellulose ethers, quaternary derivatives of guar, homopolymers and copolymers of at least 20 mole percent dimethyl diallyl ammonium chloride (DMDAAC), homopolymers and copolymers of methacrylamidopropyl trimethyl ammonium chloride (MAPTAC), homopolymers and copolymers of acrylamidopropyl trimethyl ammonium chloride (APTAC), homopolymers and copolymers of methacryloyloxyethyl trimethyl ammonium chloride (METAC), homopolymers and copolymers of acryloyloxyethyl trimethyl ammonium chloride (AETAC), homopolymers and copolymers of methacryloyloxyethyl trimethyl ammonium methyl sulfate (METAMS), and quaternary derivatives of starch.

Suitable anionic polymers include homopolymers and copolymers of acrylic acid (AA), homopolymers and copolymers of methacrylic acid (MAA), homopolymers and copolymers of 2-acrylamido-2-methylpropane sulfonic acid (AMPSA), homopolymers and copolymers of N-methacrylamidopropyl N,N-dimethyl amino acetic acid, N-acrylamidopropyl N,N-dimethyl amino acetic acid, N-methacryloyloxyethyl N,N-dimethyl amino acetic acid, and N-acryloyloxyethyl N,N-dimethyl amino acetic acid.

Anionic surfactants suitable for use with the cationic polymers include alkyl, aryl or alkyl aryl sulfates, alkyl, aryl or alkyl aryl carboxylates or alkyl, aryl or alkyl aryl sulfonates. Preferably, the alkyl moieties have about 1 to about 18 carbons, the aryl moieties have about 6 to about 12 carbons, and the alkyl aryl moieties have about 7 to about 30 carbons. Exemplary groups would be propyl, butyl, hexyl, decyl, dodecyl, phenyl, benzyl and linear or branched alkyl benzene derivatives of the carboxylates, sulfates and sulfonates., Included are alkyl ether sulphates, alkaryl sulphonates, alkyl succinates, alkyl sulphosuccinates, N-alkoyl sarcosinates, alkyl phosphates, alkyl ether phosphates, alkyl ether carboxylates, alpha-olefin sulphonates and acyl methyl taurates, especially their sodium, magnesium ammonium and mono-, di- and triethanolamine salts. The alkyl and acyl groups generally contain from 8 to 18 carbon atoms and may be unsaturated. The alkyl ether sulphates, alkyl ether phosphates and alkyl ether carboxylates may contain from one to 10 ethylene oxide or propylene oxide units per molecule, and preferably contain 2 to 3 ethylene oxide units per molecule. Examples of suitable anionic surfactants include sodium lauryl sulphate, sodium lauryl ether sulphate, ammonium lauryl sulphosuccinate, ammonium lauryl sulphate, ammonium lauryl ether sulphate, sodium dodecylbenzene sulphonate, triethanolamine dodecylbenzene sulphonate, sodium cocoyl isethionate, sodium lauroyl isethionate, and sodium N-lauryl sarcosinate.

Cationic surfactants suitable for use with the anionic polymers include quaternary ammonium surfactants of the formula $X^-N^+R^1R^2R^3$ where $R^1$, $R^2$, and $R^3$ are independently selected from hydrogen, an aliphatic group of from about 1 to about 22 carbon atoms, or aromatic, aryl, an alkoxy, polyoxyalkylene, alkylamido, hydroxyalkyl, or alkylaryl group having from about 1 to about 22 carbon atoms; and X is an anion selected from halogen, acetate, phosphate, nitrate, sulfate, alkylsulfate radicals (e.g., methyl sulfate and ethyl sulfate), tosylate, lactate, citrate, and glycolate. The aliphatic groups may contain, in addition to carbon and hydrogen atoms, ether linkages, and other groups such as hydroxy or amino group substituents (e.g., the alkyl groups can contain polyethylene glycol and polypropylene glycol moieties). The longer chain aliphatic groups, e.g., those of about 12 carbons, or higher, can be saturated or unsaturated. More preferably, $R^1$ is an alkyl group having from about 12 to about 18 carbon atoms; $R^2$ is selected from H or an alkyl group having from about 1 to about 18 carbon atoms; $R^3$ and $R^4$ are independently selected from H or an alkyl group having from about 1 to about 3 carbon atoms; and X is as described above.

Suitable hydrophobic alcohols having 6–23 carbon atoms are linear or branched alkyl alcohols of the general formula $C_MH_{2M+2-N}(OH)_N$, where M is a number from 6–23, and N is 1 when M is 6–12, but where M is 13–23, N may be a number from 1 to 3. Our most preferred hydrophobic alcohol is lauryl alcohol, but any linear monohydroxy alcohol having 8–15 carbon atoms is also preferable to an alcohol with more or fewer carbon atoms.

By a gel promoter we mean a betaine, a sultaine or hydroxysultaine, or an amine oxide. Examples of betaines include the higher alkyl betaines such as coco dimethyl carboxymethyl betaine, lauryl dimethyl carboxymethyl betaine, lauryl dimethyl alphacarboxyethyl betaine, cetyl dimethyl carboxymethyl betaine, cetyl dimethyl betaine, lauryl bis-(2-hydroxyethyl) carboxymethyl betaine, oleyl dimethyl gamma-carboxypropyl betaine, lauryl bis-(2-hydroxypropyl)alpha-carboxyethl betaine, coco dimethyl sulfopropyl betaine, lauryl dimethyl sulfoethyl betaine, lauryl bis-(2-hydroxyethyl) sulfopropyl betaine, amidobetaines and amidosulfobetaines (wherein the $RCONH(CH_2)_3$ radical is attached to the nitrogen atom of the betaine), oleyl betaine, and cocamidopropyl betaine. Examples of sultaines and hydroxysultaines include materials such as cocamidopropyl hydroxysultaine.

By a Zeta potential having an absolute value of at least 20 we mean a Zeta potential having a value of +20 of higher or −20 or lower.

Amphoteric surfactants suitable for use with either cationic polymers or anionic polymers include those surfactants broadly described as derivatives of aliphatic secondary and tertiary amines in which the aliphatic radical can be straight or branched chain and wherein one of the aliphatic substituents contains from about 8 to about 18 carbon atoms and one contains an anionic water solubilizing group such as carboxy, sulfonate, sulfate, phosphate, or phosphonate. Suitable amphoteric surfactants include derivatives of aliphatic secondary and tertiary amines in which the aliphatic radical can be straight or branched chain and wherein one of the aliphatic aliphatic substituents contains from about 8 to about 18 carbon atoms and one contains an anionic water solubilizing group, e.g., carboxy, sulfonate, sulfate, phosphate, or phosphonate. Examples of compounds falling within this definition are sodium 3-dodecylaminopropionate, and sodium 3-dodecylaminopropane sulfonate.

Suitable amine oxides include cocoamidopropyl dimethyl amine oxide and other compounds of the formula $R^1R^2R^3N{\rightarrow}O$ wherein $R^3$ is a hydrocarbyl or substituted hydrocarbyl having from about 8 to about 30 carbon atoms, and $R^1$ and $R^2$ are independently hydrogen, a hydrocarbyl or substituted hydrocarbyl having up to 30 carbon atoms. Preferably, $R^3$ is an aliphatic or substituted aliphatic hydrocarbyl having at least about 12 and up to about 24 carbon atoms. More preferably $R^3$ is an aliphatic group having at least about 12 carbon atoms and having up to about 22, and most preferably an aliphatic group having at least about 18 and no more than about 22 carbon atoms.

More particularly, our preferred compositions include aqueous gels comprising water and, by weight based on the water, (a) 0.1% to 5% by weight cationic polymer and (b) 0.01% to 2% by weight of an anionic surfactant, preferably a linear alkyl sulfate having from 8 to 22 carbon atoms, (c) 0.001% to 5%, more preferably 0.001% to 2%, and most preferably 0.001% to 0.5% by weight of a hydrophobic alcohol having from 6 to 23 carbon atoms, and an effective amount of a gel promoter, preferably within those classes of compounds (amphoteric surfactants and amine oxides) described above, the gel having a Zeta Potential absolute value of at least 20 millivolts and, preferably, a viscosity of at least 100 cps as measured by a Brookfield Viscometer. Our invention also includes a method of making a cationic polymer coacervate comprising forming a solution comprising at least 0.1% of a cationic polymer, adding to the solution at least one anionic surfactant in an amount by weight (a) less than the cationic polymer and (b) effective to obtain an absolute Zeta potential value of at least 20 millivolts and a viscosity of at least 100 cps as measured by a Brookfield viscometer [Brookfield DVII; LV spindle set #4 @500 rpm]; our invention also includes such a gel. The process includes the addition of 0.001% to 5% or more of a hydrophobic alcohol having 6–23 carbon atoms; that is, preferably, a linear or branched alkyl alcohol of the general formula $C_MH_{2M+2-N}(OH)_N$, where M is a number from 6–23, and N is 1 when M is 6–12, but where M is 13–23, N may be a number from 1 to 3. Our most preferred hydrophobic alcohol is lauryl alcohol, but any linear monohydroxy alcohol having 8–15 carbon atoms is also preferable to an alcohol with more or fewer carbon atoms.

Where an anionic polymer is used, our compositions include aqueous gels comprising water and, by weight based on the water, (a) 0.1% to 5% anionic polymer and (b) 0.1% to 2% of a cationic surfactant, preferably a quaternary ammonium compound having from 8 to 22 carbon atoms, the gel having a Zeta Potential absolute value of at least 20 millivolts and, preferably, a viscosity of at least 100 cps as measured by a Brookfield Viscometer (see above for the conditions). Again, most preferably the alcohol is a linear or branched alkyl alcohol of the general formula $C_MH_{2M+2-N}(OH)_N$, where M is a number from 6–23, and N is 1 when M is 6–12, but where M is 13–23, N may be a number from 1 to 3; the anionic polymer is preferably a homopolymer or copolymer (at least 20% by weight) of AMPSA.

Our invention also includes a method of making an aqueous gel comprising adding to water 0.1% to 5%, based on the water, cationic polymer and a lesser amount but at least 0.01%, up to 4% or more, of an anionic surfactant having from 8 to 22 carbon atoms, in the presence of a linear or branched alkyl alcohol of the general formula $C_MH_{2M+2-N}(OH)_N$, where M is a number from 6–23, and N is 1 when M is 6–12, but where M is 13–23, N may be a number from 1 to 3, preferably in an amount from 0.001% to 5% by weight, the ratio of said cationic polymer to said anionic surfactant being effective to provide a Zeta Potential of at least 20. Preferably the polymer will be a homopolymer.

In addition, our invention includes a method of fracturing a subterranean formation comprising forming a gel or a coacervate as described herein and pumping the gel or coacervate down a wellbore, together with a proppant and under pressure sufficient to fracture the formation. Proppants suitable for our invention include all the generally used or generally accepted proppant materials such as sand, walnut shells, and other hard particulates. The gel may be used in the absence of conventional brine-forming salts. Aqueous based gels used for formation fracturing and other well treatment usually employ guar, cellulose, or gums that depend on chemical bonding and are shear-sensitive. The compositions of our invention can be easily pumped, yet will form strong gels when in use. Our compositions are not only easily pumped, but provide a friction reducing effect. In well drilling, our gel may be used, for example, in concentrations of 0.25% to 1% or more by weight whether or not foam is deliberately generated; for subterranean formation fracturing, somewhat higher concentrations may be desired—for example 0.75% to 1.5% gel or more by weight in the fracturing fluid (which will normally include a proppant) are useful. Our gel compositions are compatible with conventional drilling fluid and fracturing fluid compositions. Gel breakers may be employed with them, and in particular gel breaking may be accomplished by ordinary inorganic salts such as sodium chloride, lithium chloride, magnesium chloride or any other chloride or other salt such as a formate; also by benzoic acid, various bisulfites or polyether glycols ("Carboxax", for example) as is known in the art of gel breaking generally.

BRIEF DESCRIPTION OF THE DRAWINGS

In FIG. 3, the effect of a wide variance of pH on viscosity is shown as applied to the same basic composition of FIG. 3.

FIG. 4 demonstrates the viscosity effects of small amounts of hexanol on a base composition of our invention.

DETAILED DESCRIPTION OF THE INVENTION

Figure 1:
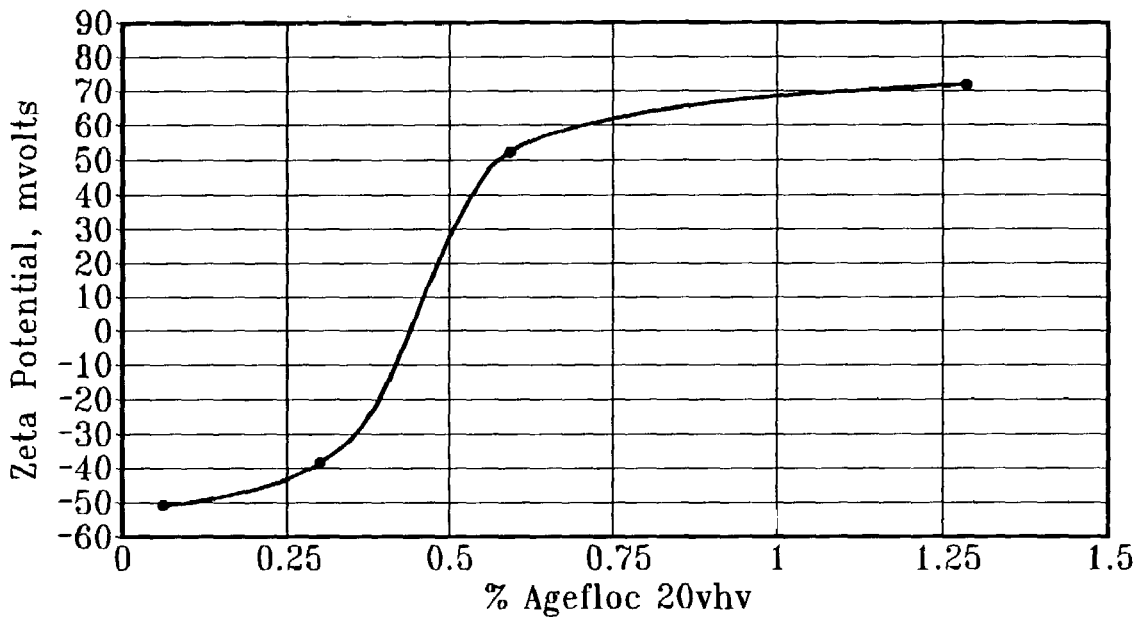
FIG. 1 plots the Zeta Potential of increasing concentrations of cationic polymer in aqueous solution with a constant amount of the anionic surfactant sodium lauryl sulfate.

Although we prefer to use polymers of diallyl dimethyl ammonium chloride and particularly its homopolymers where cationic polymers are used in our invention, we may use any water soluble cationic polymer effective to viscosify water. Preferably the polymers will have a molecular weight of at least 10,000. Such polymers include homopolymers and copolymers made with cationic monomers (that is, at least 20% of the mer units contain cationic functional groups, while the balance may be nonfunctional or nonionic) such as diallyldimethylammonium chloride, methacrylamidopropyltrimethyl ammonium chloride, acryloyloloxyethyltrimethylammonium chloride, diallyl diethylammonium chloride, methacryloyoloxyethyltrimethyl ammonium chloride, vinyl pyridine, and vinyl benzyltrimethyl ammonium chloride.

The preferred anionic surfactant to be used with the cationic polymer is sodium lauryl sulfate, but any alkali metal alkyl sulfate or sulfonate having 8–22 carbon atoms may be used, and alkyl ether sulfates and sulfonates having 8–22 carbon atoms are included within our term "counterionic surfactant". Commercial forms of sodium lauryl sulfate including minor or even significant amounts of other similar surfactants may be used. Other common anionic surfactants may also be useful.

The alkyl alcohol is preferably a linear alkyl one having from 8 to 22 carbon atoms or, more preferably, 8–15 carbon atoms. Commercial forms of lauryl alcohol having other alcohols as a minor ingredient are satisfactory. We have found that some commercial forms of sodium lauryl sulfate contain lauryl alcohol in amounts sufficient to satisfy the lauryl alcohol requirements of our invention, and accordingly such sodium lauryl sulfates may sometimes be used as the anionic surfactant of our invention together with a cationic polymer, but without additional moieties of lauryl alcohol or other hydrophobic alcohol as described herein. We may substitute sodium lauryl ether sulfate for the sodium lauryl sulfate; lauryl alcohol should be added separately where this substitution is made.

When used, the amine oxide promoter is preferably lauryl amine oxide, but we may use any amine oxide of the formula $R^1R^2R^3NO$, preferably $R^1N(CH_3)_2O$, where $R^1$ is an alkyl group of 8–22 carbon atoms, and $R^1$ and $R^2$ are independently alkyl groups having from 1 to 4 carbon atoms. We may use any amine oxide of the formula $R^1R^2R^3N \rightarrow O$ as defined by Dahayanake et al in U.S. Pat. No. 6,258,859, which is hereby incorporated by reference in its entirety. See also Tillotson U.S. Pat. No. 3,303,896 and Thompson U.S. Pat. No. 4,108,782, which are also incorporated by reference in their entirety for their descriptions of amine oxides. Generally, up to 1% by weight may be used, but as will be seen in FIG. 8, concentrations in the range of 0.1% to 0.4% may be quite sufficient for gel promotion.

When used, the amphoteric surfactant is preferably a betaine such as cocamidopropyl betaine, but we may use other types of amphoteric surfactants, including aminopropionate and sultaines. We may use any of the surfactant betaines listed or described by Sake et al in U.S. Pat. No. 6,284,230, which is hereby incorporated by reference in its entirety.

The weight ratio of cationic polymer to alkyl sulfate is generally 10:1 to 1.1:1, but the ratio may also be based on the molar ratio of cationic moieties on the polymer and the anionic sites on the surfactant.

Where an anionic polymer is used, we prefer to use a homopolymer of "AMPSA"—acrylamidomethylpropyl sulfonic acid—together with a common quaternery surfactant generally in the same ratios as recited above for cationic polymers and anionic surfactants, provided the absolute value of the Zeta Potential is at least 20. This may be done with or without gel promoters, but where there are no gel promoters, the concentration of anionic polymer will be significantly higher than where a gel promoter is used.

In FIG. 1, the Zeta potential of combinations of increasing percentages of cationic polymer with 0.5% sodium lauryl sulfate is presented. As is known in the art, where the Zeta potential is 0, there is no stability to the suspension and the materials in question will drop out of an aqueous carrier. As seen in FIG. 1, high and low ratios of cationic polymer to anionic surfactant have significant Zeta Potential readings, while the intermediate weight ratios of these particular materials have lower Zeta Potential readings. In FIG. 1, the cationic polymer "Agefloc 20 vhv" is a homopolymer of dimethyl diallyl ammonium chloride having an average molecular weight of 250,000; a 20% solution of poly diallyl dimethyl ammonium chloride homopolymer ("pDADMAC") was used. A coacervate is formed where the Zeta potential is either higher than +20 millivolts or "lower" than −20 millivolts, i.e. has an absolute value of at least 20. As used herein, the term absolute value means a positive or a negative number; thus a "Zeta Potential having an absolute value of at least 20 millivolts" includes either a positive or a negative value of the measurement in millivolts. While FIG. 1 shows the weight percents of the ingredients, the relative charge densities of the polymer and the necessary amount of oppositely charged surfactant are important in determining the Zeta Potential.

Figure 2:
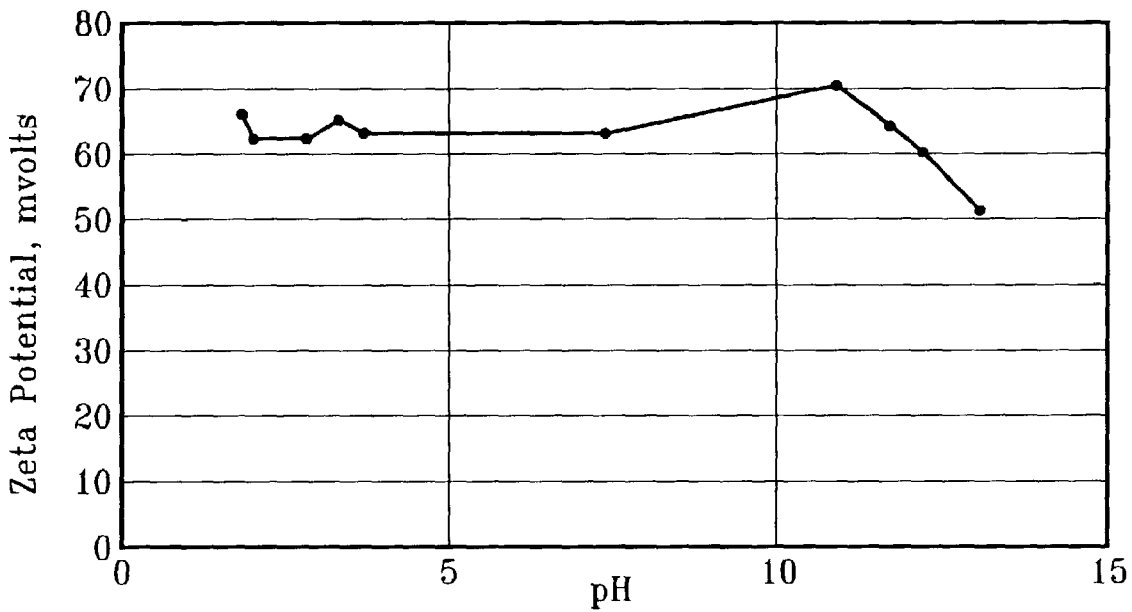
FIG. 2 shows the effect of pH on Zeta Potential of a combination of cationic polymer and sodium lauryl sulfate at a particular ratio, a basic composition of our invention.

FIG. 2 employs a composition, called "Zeta Gel" in this and other figures herein, comprising 1.3% Agefloc20 vhv pDADMAC and 0.5% sodium lauryl sulfate, which provided the data point in FIG. 1 at about 68 millivolts. FIG. 2 shows that the Zeta Potential of this composition of our invention is not significantly affected through a wide range of pH. For generating the data of FIG. 2, potassium hydroxide was used to increase the pH and formic acid was used to decrease it. The term "½ Zeta Gel" means the Zeta Gel solution was diluted by 50%, providing a solution actually used of 1.3% cationic polymer and 0.5% anionic surfactant.

In FIG. 3, the pH was varied in a composition similar to that of FIG. 2 to determine the effect of pH on viscosity of the composition. While the viscosity is somewhat lower at pH 7 than for higher and lower pH's, it is otherwise not significantly affected by pH.

Figure 5:
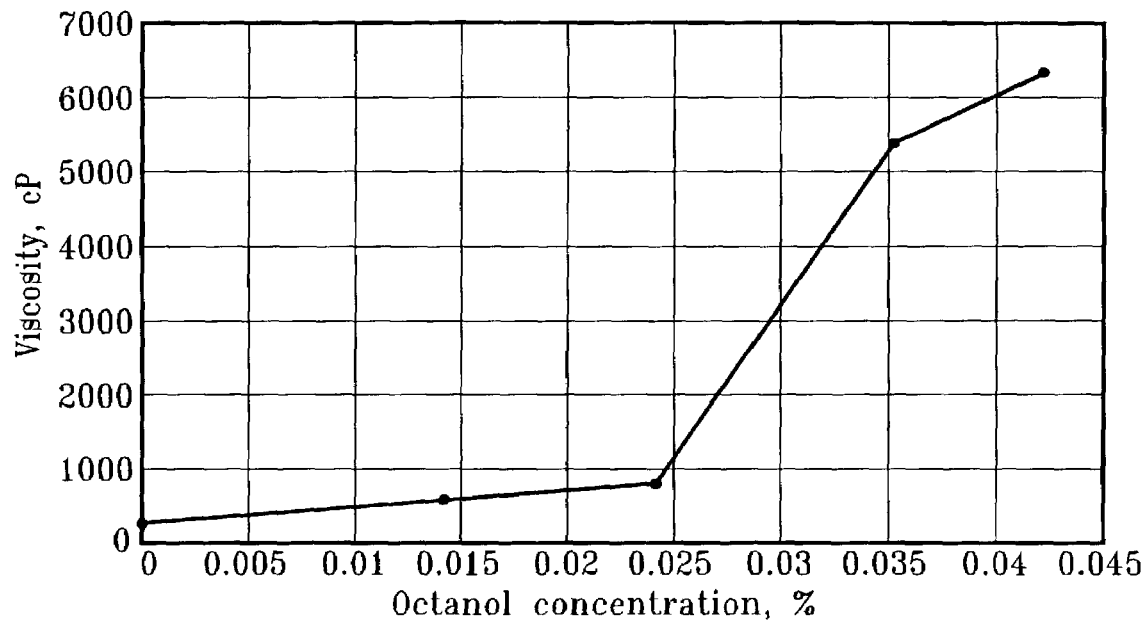
FIG. 5 plots viscosity effects the inclusion of small amounts of octanol in a base composition of our invention.

FIGS. 4 and 5 are charts showing the viscosity of the composition used in FIGS. 2 and 3 when hexanol and octanol are used for the hydrophobic alcohol, respectively. For these pDADMAC and sodium lauryl sulfate concentrations and/or for this ratio of the ingredients, it is seen that the viscosities generally increase with increasing concentrations of the alcohol used.

Figure 6:
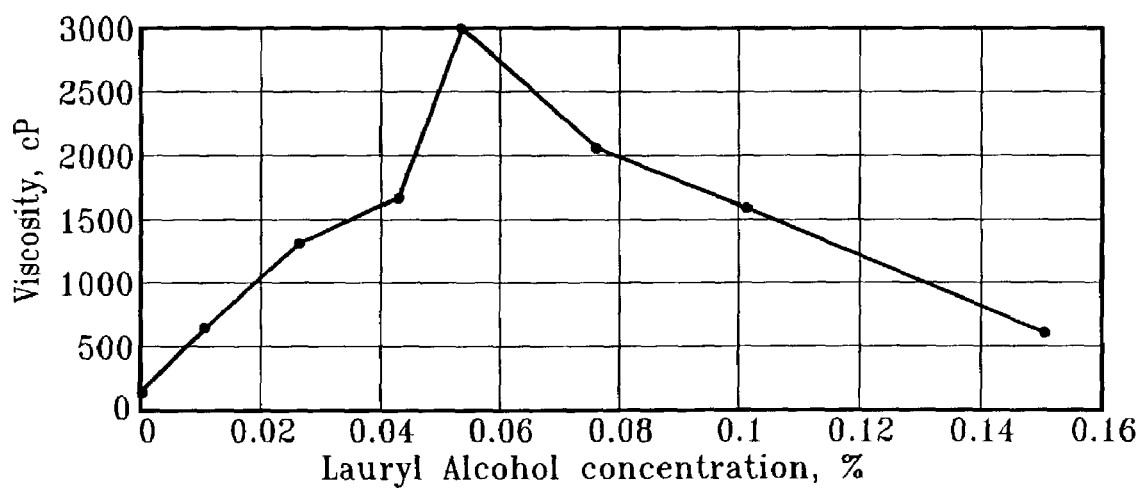
FIG. 6 plots viscosity effects the inclusion of small amounts of lauryl alcohol in a base composition of our invention.

In FIG. 6, where lauryl alcohol is substituted for the hexanol and octanol of FIGS. 4 and 5, it is seen that the viscosity increases rapidly with increasing concentration of lauryl alcohol until about 0.05 percent; then decreases with increasing concentration. Persons skilled in the art may realize that this may provide a tool for manipulating the viscosity as required for various purposes.

Figure 7:
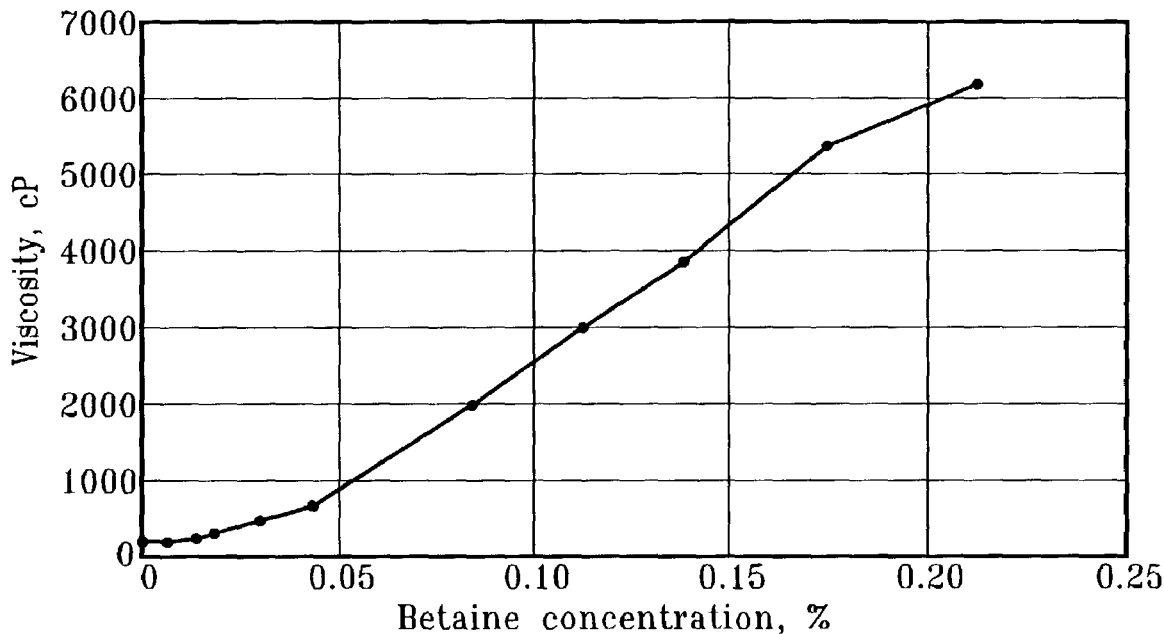
FIG. 7 shows the viscosity of our composition as a function of increasing concentrations of added betaine.

FIG. 7 is a chart demonstrating that increasing concentration of betaine in the same basic composition of the previous figures will result in increasing viscosities. Similar curves (not shown) were obtained substituting the betaines "Mirataine CAB-A" (cocamidopropyl betaine), "Mirataine BB" (lauramidopropyl betaine), and "Mirataine CBS" (cocamidopropyl hydroxy sultaine) for the betaine of FIG. 7.

Figure 8:
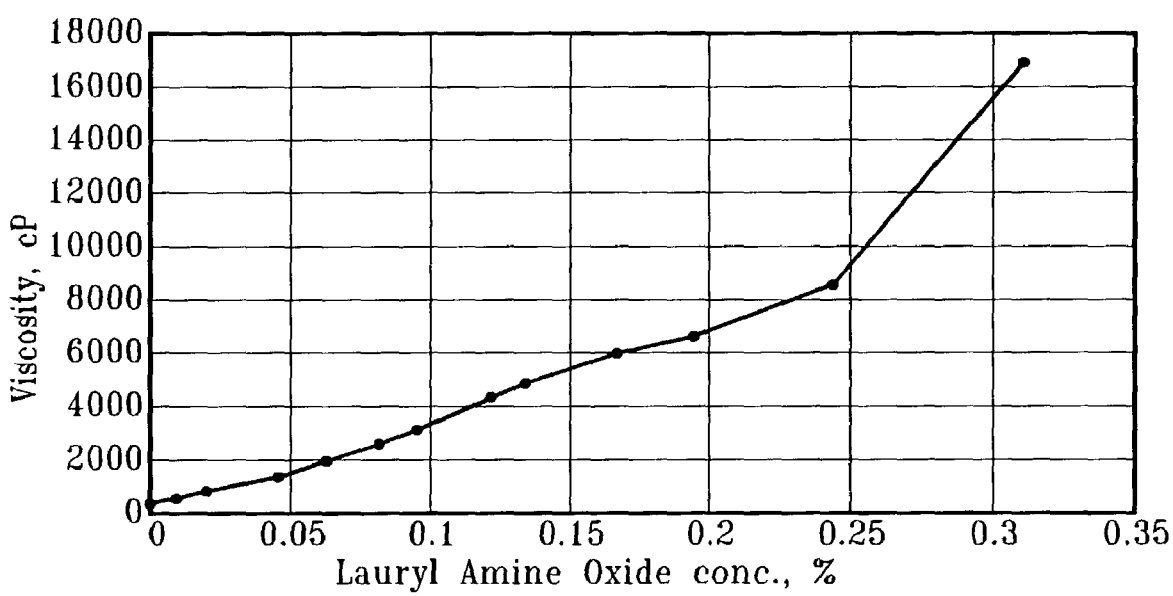
In FIG. 8, an amine oxide was added to the base composition at various low concentrations to determine the effect on viscosity.

Likewise, as shown in FIG. 8, increasing concentrations of amine oxide will increase the viscosity of the base composition of cationic polymer and a selected smaller percentage of anionic surfactant.

Table 1 below shows the effect on viscosity of certain of our compositions with components in addition to polymer and surfactant.

TABLE 1

| SLS[1] | pDADMAC[2] | Am Ox[3] | Betaine[4] | Alcohol[5] | Viscosity |
|---|---|---|---|---|---|
| 0.50% | 6.5%/1.3% | 0 | 0 | 0 | 200 cP |
| 0.25% | 3.25%/0.65% | 0 | 0 | 0 | 20 cP |
| 0.25% | 3.25%/0.65% | 0 | 0.35% | 0 | 900 cP |
| 0.25% | 3.25%/0.65% | 0 | 0.35% | 0.025% | 3350 cP |
| 0.25% | 3.25%/0.65% | 0.30% | 0.35% | 0.025% | 5500 cP |

In Table 2, a different source of sodium lauryl sulfate is used for comparison, using all the other ingredients in the same concentration as Table 1.

TABLE 2

| SLS[1] | pDADMAC[2] | Am Ox[3] | Betaine[4] | Alcohol[5] | Viscosity |
|---|---|---|---|---|---|
| 0.50% | 6.5%/1.3% | 0 | 0 | 0 | 5700 cP |
| 0.25% | 3.25%/0.65% | 0 | 0 | 0 | 60 cP |
| 0.25% | 3.25%/0.65% | 0 | 0.35% | 0 | 3850 cP |
| 0.25% | 3.25%/0.65% | 0 | 0.35% | 0.025% | 5000 cP |
| 0.25% | 3.25%/0.65% | 0.30% | 0.35% | 0.025% | 6150 cP |

Following is a key to the superscripts in Tables 1 and 2:
1. SLS=sodium lauryl sulfate. In Table 1, the SLS was 70% from Aldrich; in Table 2, it was Acmepon 95%. Values in the tables are in terms of pure SLS.
2. pDADMAC is poly(diallyldimethyl ammonium chloride) homopolymer having a average molecular weight of 250,000 in Table 1 and at least 400,000 in Table 2. In each case, it was used as a 20% solution; hence the percentage on the left in each cell of the tables is the amount of solution and the percentage on the right is the amount of neat pDADMAC.
3. Am Ox is a 40% solution of lauryl amine oxide, SHER-REX 1770.
4. The betaine used in all cases was cocamidyopropyl betaine.
5. The alcohol was dodecanol, i.e. lauryl alcohol.
6. Viscosity is reported as centipoises as measured on RTV Brookfield viscometer at 20 rpm using spindle #4 and at ambient temperature.

A comparison of the initial use of the sodium lauryl sulfate, at 0.5% in each case, shows a much higher viscosity achieved by the Acmepon product. We surmise that this is attributable to a higher percentage of lauryl alcohol impurity in the Acmepon product. Persons skilled in the art will perceive that the rest of the data are consistent with this assumption. The compositions including separately added lauryl alcohol yielded significantly higher viscosities than the remainder of those without such a separate addition.

Figure 9:
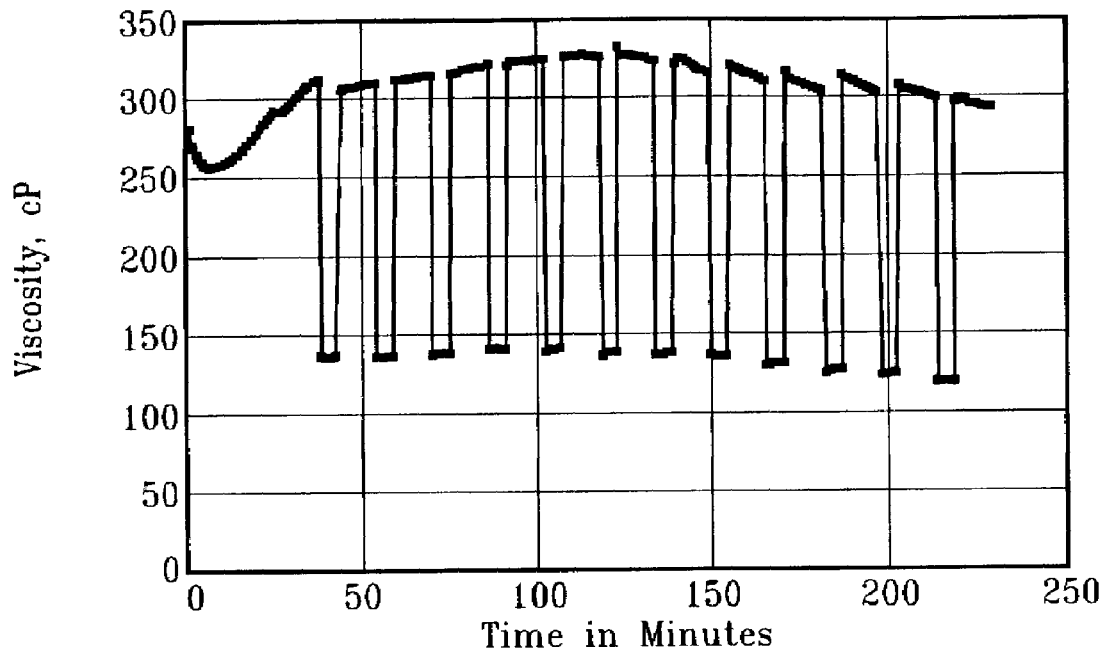
FIGS. 9 and 10 show the thixotropicity and shear stability of a variation of our composition including three additives: a betaine, an amine oxide, and an alkyl alcohol.

In FIG. 9, the thermal and shear stability of a multiple ingredient gel of our invention is shown in terms of Fann viscosity. For this data collection, a gel of half the concentration of polymer and surfactant [called "¼ Zeta Gel" on FIG. 9] was used, compared to the charts of FIGS. 1–8. That is, the pDADMAC was 0.65% by weight (having a molecular weight of 400,000 to 500,000) and the sodium lauryl sulfate was at 0.25%. A 40% solution of amine oxide was used providing a 0.12% concentration, and the betaine was 30% active; the betaine was therefore 0.105% by weight, and the lauryl alcohol was at 0.025%. The "3 additives" are thus the amine oxide, the betaine, and the lauryl alcohol. The Brookfield viscometer was alternately run at 100 rpm (top data series) and 300 rpm (lower data series). As can be seen from the chart, only negligible shear deterioration is evidenced at 160° F. over a period of continuous alternate high and low shear. It is clear that our invention permits the use of quite low concentrations of polymer to achieve excellent viscosities and viscosity stabilities.

Figure 10:
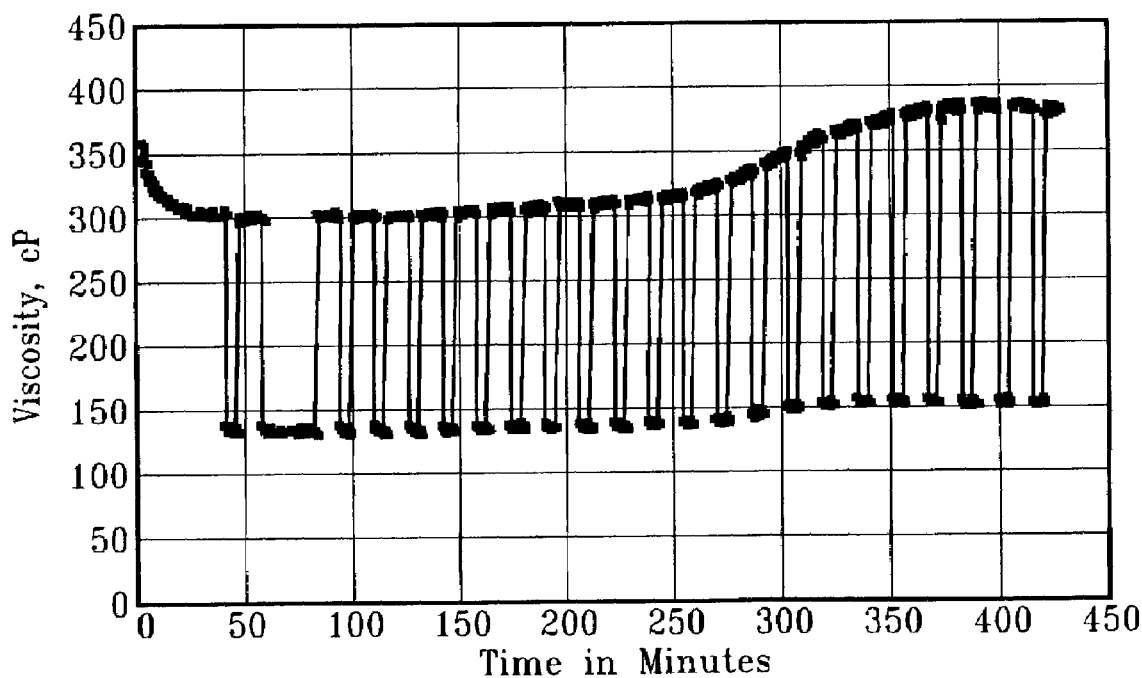

FIG. 10 shows similar alternating shear runs on the same composition as FIG. 9 using a Fann 50 viscometer, this time at 120° F. The thixotropic nature of the coacervate gel is demonstrated again.

Figure 11:
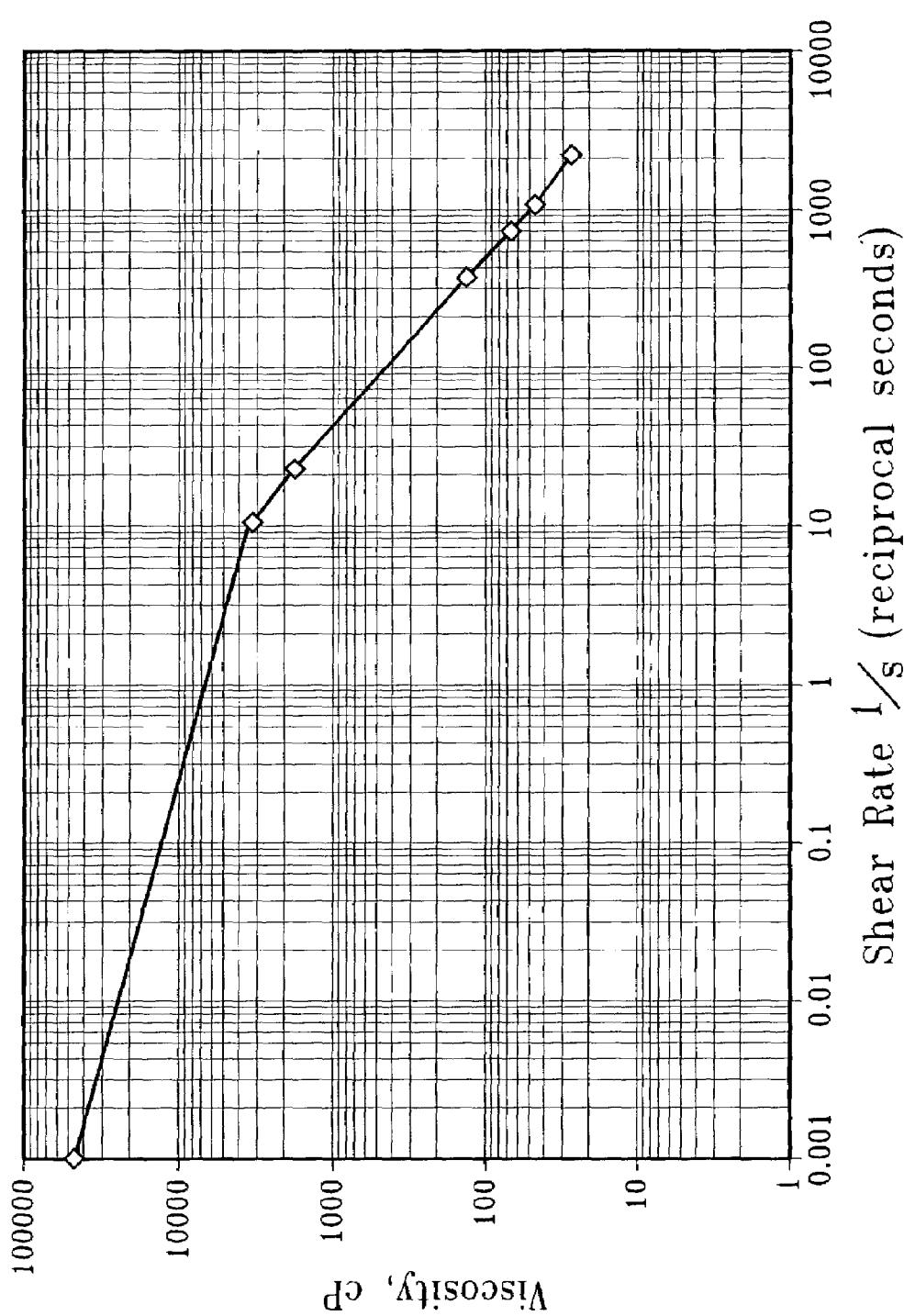
FIG. 11 is a chart showing viscosity in a 1.1% solution of a composition of the invention, notably the "zero shear" viscosity.

In FIG. 11, shear rate in reciprocal seconds is plotted against viscosity in centipoise, leading to an extrapolated "zero shear viscosity" of 46,361 cp, an excellent viscosity reading series for a well fracturing fluid. See SPE 73755, "*Zero Shear Viscosity Determination of Fracturing Fluids: As Essential Parameter in Proppant Transport Characterizations*" by Mahmoud Asadi, SPE, Michael W. Conway, SPE Stim Lab Inc., and Robert D. Barree, SPE, Barree and Associates. FIG. 11 is a nonlinear regression model following the procedure described by Asadi, Conway and Barree particularly with respect to FIGS. 5, 6, and 7 of that paper. As is known in the well fracturing art, in which a subterranean formation is fractured to facilitate the removal of hydrocarbons, it is necessary for the fluid first to transport the proppant to the fractures and then to suspend it for a useful period of time. The gelled fluid carrying the proppant is subject to wide ranges of shear depending, for example, on proximity to the fracture wall. Then, at rest, as the fractures are typically vertical, a dense, solid, propping agent has a tendency to sink in the fracturing fluid before it can be put to use, unless the fracturing fluid is able to suspend it. Accordingly, a projection of viscosity under zero shear, i.e. in which the fluid is substantially quiescent, provides highly significant information for the technician. In this case, the zero shear results are excellent, while results at other shear rates and temperatures are also excellent for pumpability and proppant transport. Our invention includes an aqueous gel comprising no more than 1% water soluble polymer having a zero shear viscosity of at least 45,000 following the zero shear viscosity extrapolation procedure of Asadi, Conway and Barree in SPE 73755.

The zero shear viscosity extrapolation of FIG. 11 is reinforced by the results shown in the following tabulations, a rough settling rate test performed on our gel at 1.1% by weight active (the same gel as used for FIGS. 9, 10 and 11), containing 0.65% polymer). A 100 ml graduated cylinder is filled with a test gel made by mixing 10 ml (weighing 16 g) of "20/40" proppant, a common commercial proppant of ceramic spheres, homogeneously dispersed in 100 ml of gel and maintained at 80° F. Settling of the proppant in the cylinder was then observed at the intervals shown, recording the depth of the substantially clear gel from the top of the cylinder.

| Minutes: | 0 | 10 | 30 | 45 | 60 | 75 | 90 | 110 | 139 | 150 | 180 |
|---|---|---|---|---|---|---|---|---|---|---|---|
| Mm from top | 0 | 0 | 3.5 | 5 | 7 | 8 | 9.5 | 11 | 14.5 | 16 | 18 |

The result after 60 minutes, 7 millimeters of substantially clear gel, compares quite favorably with the settling rate, for example, of a Diesel gel which exhibited 16 ml of settling after 60 minutes. We refer to the above described settling rate test as a "10/100 20/40" settling rate test, meaning that a 20/40 proppant is used in a volume ratio of proppant to gel of 10/100 in a gel comprising 0.65% polymer. The depth of the upper layer of clear gel after 1 hour of settling provides a good rough comparison. Thus, our invention includes an aqueous gel comprising no more than 1% by weight water soluble polymer, preferably no more than 0.7% by weight polymer, characterized by a "10/100 20/40" settling rate result at 60 minutes of no more than 8 millimeters, preferably no more than 7 millimeters.

Figure 12:
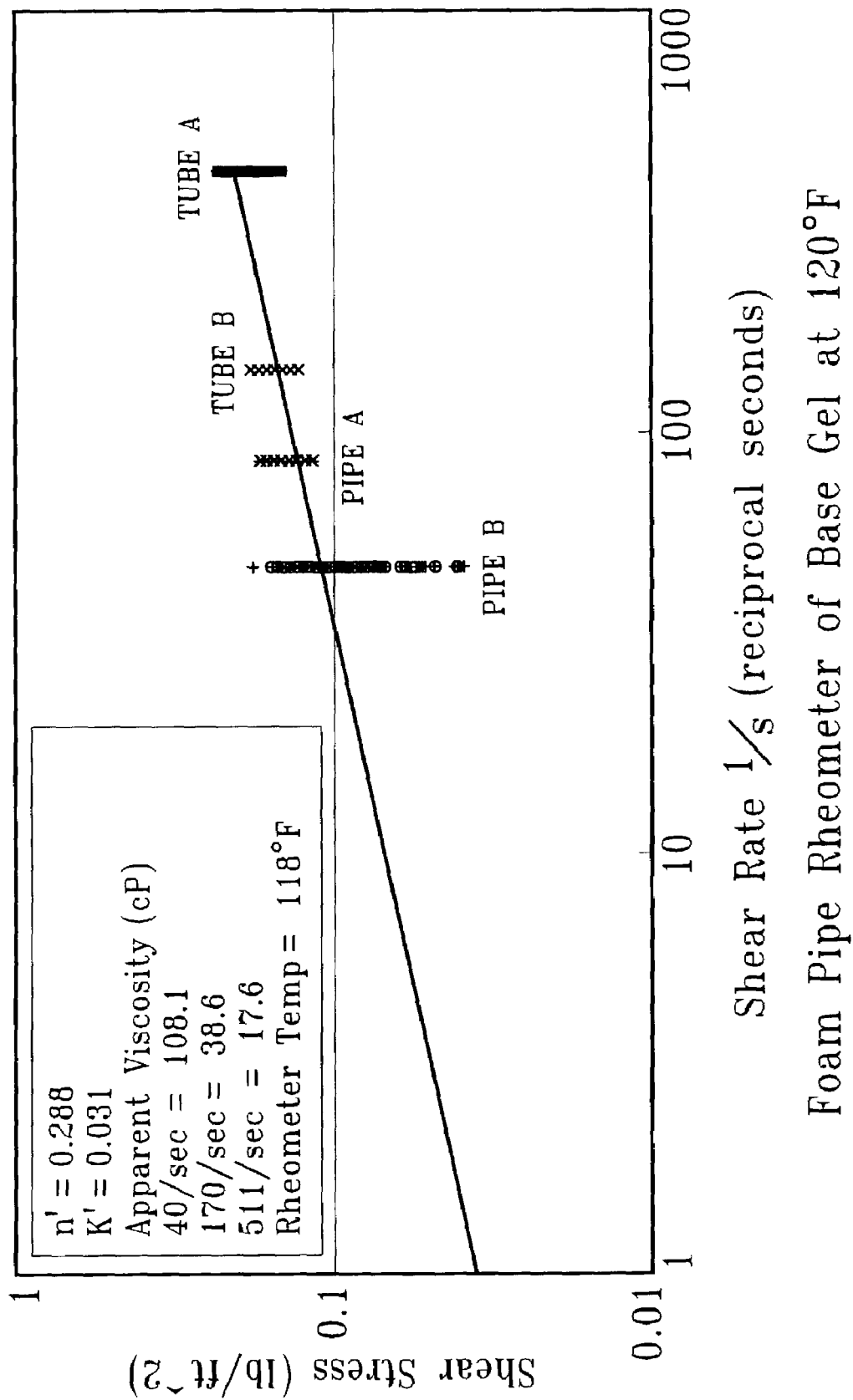
FIG. 12 shows foam pipe rheometer results in test pipes (shear stress plotted against shear rate) of a basic gel of our invention at a constant test temperature.

In FIG. 12, test results are shown for a rheometric test performed on our base gel (1.3% polymer). Prior to testing, the base gel had Fann 35 viscosity readings, at 75° F. and a pH of 3.05, as follows:

| RPM | Reading |
|---|---|
| 3 | 6 |
| 6 | 8 |
| 100 | 20 |
| 200 | 25 |
| 300 | 30 |
| 600 | 40 |

Standard foam generating surfactants were used to simulate a foam system and nitrogen was used as the gas. The mixture was pumped through sand to generate a standard foam texture and, at 1200 ml/min, routed to each of four conduits designated Tube A, Tube B, Pipe A, and Pipe B. Tube A has an internal diameter of 0.30 inch and is 5.29 feet long; tube B has an I.D of 0.45 inch and is 10.53 feet long, pipe A has an I.D of 0.50 inch and is 14.29 inches long, and Pipe B has an I.D. of 0.61 inch and is 20.45 feet long. Pressure drops across the lengths of the tubes and pipes are collected, temperatures are measured in the centers of the conduits. Viscosities are calculated and reported in FIG. 12. Additional runs conducted with 25, 50, and 75 quality foams (reflecting the amount of nitrogen), revealed excellent half lives.

Figure 13:
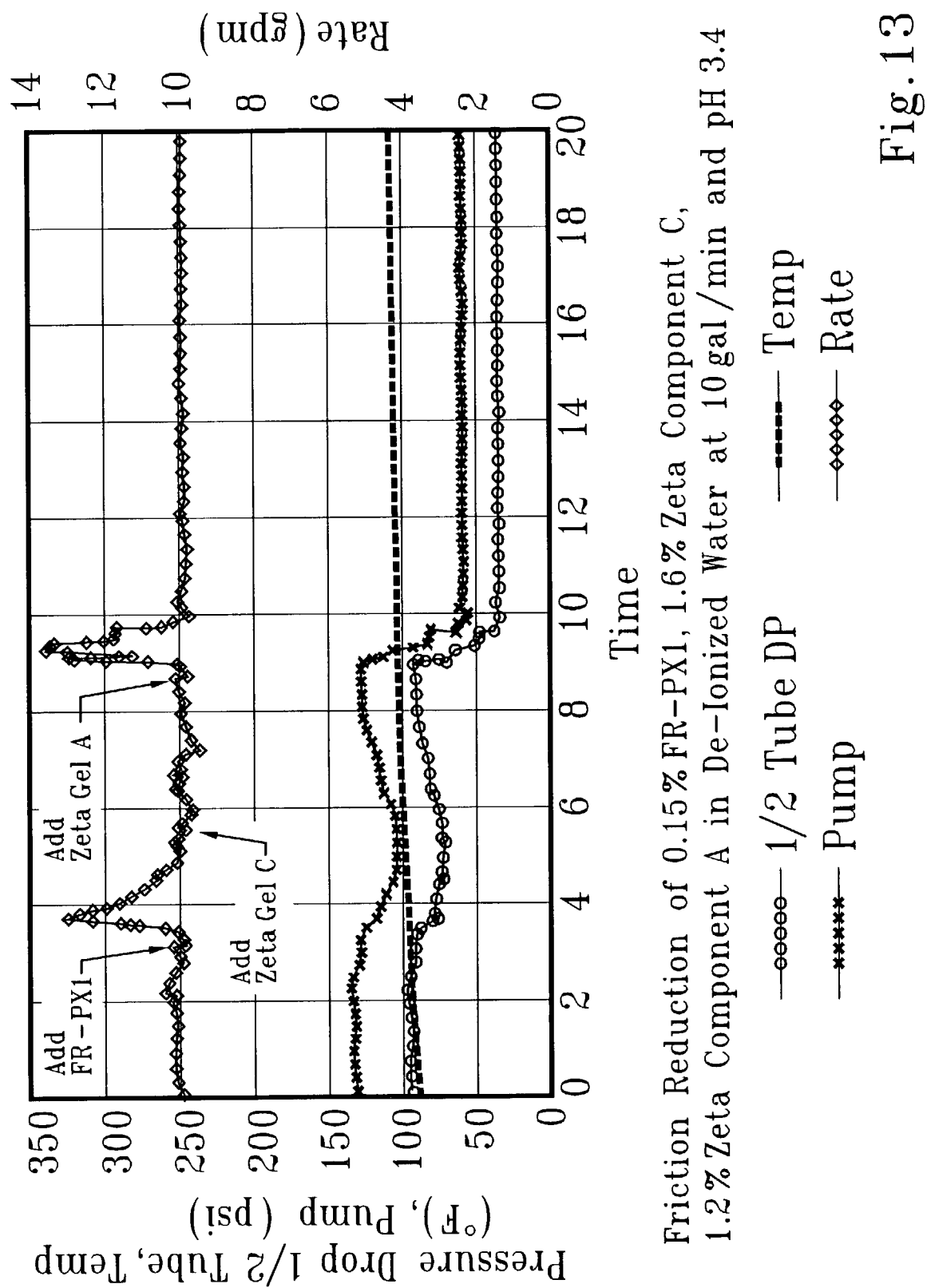
FIG. 13 graphically illustrates the results of a laboratory test of the friction reduction effects of our invention.

FIG. 13 illustrates the friction reduction effects of the invention. As reviewed above in the Background of the Invention and as is known in the art of formation fracturing in conjunction with well drilling for hydrocarbon recovery, significant savings in energy can be realized by converting the turbulent flow of the formation fracturing fluid through the well bore into laminar flow. Various water-soluble polymers have been used in the past to accomplish the conversion. We have found that the coacervate gel of this invention may be used together with a nonionic polymer to convert the turbulent flow of the fracturing fluid to a substantially laminar flow.

The plots of FIG. 13 were obtained using stainless steel tubing of 0.43 inch internal diameter, having a length of 57 feet, and equipped with an appropriate pump and pressure drop sensors. A flow rate of 10 gallons per minute was established for water over a period of two minutes; then stepwise additions of 0.3% by weight acetic acid, 0.15% FR-PX-1 (a commercial polyethylene oxide polymer), 1.6% by weight of a preferred cationic component of our coacervate gel (polyDADMAC having a molecular weight of about 2,000,000, referred to in the caption as Zeta Component C), and 1.2% by weight of a preferred anionic component of our coacervate gel, sodium lauryl sulfonate, referred to in the caption of FIG. 13 as Zeta Component A. At a flow rate of 10 gpm, the Reynolds number for plain water was 73,500, indicating fully turbulent flow. After each addition, the flow rate was re-adjusted to 10 gpm. The temperature increased slightly during the test. From the chart, persons skilled in the art will recognize that on the addition of Component A, there was a dramatic reduction in pressure, indicating an abrupt conversion from turbulent to laminar flow. The pressure achieved, 34.5 psi, represents a friction reduction of 64%, which was maintained for an additional ten minutes to the termination of the test.

Our invention thus includes a friction reducing composition comprising a gel component and a nonionic polymer. The gel component is as described herein, and the nonionic polymer is preferably polyethylene oxide, but may be any water soluble polymer (including copolymers such as copolymers of ethylene oxide and propylene oxide) having a molecular weight of at least 1000 and capable of inhibiting turbulent flow in an aqueous fluid in a conduit. Such materials are hereafter called water soluble nonionic friction reducers; we intend to include natural and modified gums such as guar and its nonionic derivatives, hydroxyethyl cellulose and Xanthan gums having the friction reducing properties as well as polypropylene glycols and polyethylene glycols (hereafter called polyalkylene glycols), again having a molecular weight of at least 1000. Our invention also includes a method of conserving energy in subterranean formation fracturing comprising fracturing said subterranean formation using a fracturing fluid comprising (1) a water soluble nonionic friction reducer and (2) an aqueous gel comprising water and, by weight based on the water, (a) 0.1% to 5% of an anionic or cationic polymer, (b) a lesser amount but at least 0.01% of a surfactant having from 8 to 22 carbon atoms and a charge opposite that of said polymer, (c) from 0.001 to 5% of a hydrophobic alcohol, (d) up to 5% of an amphoteric surfactant, and (e) up to 5% of an amine oxide, said gel having a Zeta Potential of an absolute value of at least 20 millivolts). The water soluble nonionic friction reducer (1) may be present in the fracturing fluid or other fluid for which the friction reduction is desired in a concentration from 0.0001% by weight to 1.0% by weight (or more—as much as 5% or more if a friction reducing effect is still manifested); at the same time the gel component (2) is present in amount providing 0.1% to 5% of an anionic or cationic polymer with the other gel components as described herein. Preferably the water soluble nonionic friction reducer is polyethylene oxide of a molecular weight at least 5000, more preferably 10,000. Also preferably the water soluble nonionic friction reducer is present in a concentration of 0.1% to 0.3% by weight. Stated another way, the nonionic water soluble friction reducer is preferably present in a ratio to the anionic or cationic polymer of the gel in a weight ratio of 0.001:1 to 5:1. Proppants and other fracturing fluid constituents may be present in desired amounts.

Thus it is seen that our invention includes an aqueous gel comprising water and, by weight based on the water, (a) 0.1% to 5% of an anionic or cationic polymer, (b) a lesser amount but at least 0.01% of a surfactant having from 8 to 22 carbon atoms and a charge opposite that of said polymer, (c) from 0.001 to 5% of a hydrophobic alcohol, (d) up to 5% of an amphoteric surfactant, and (e) up to 5% of an amine oxide, said gel having a Zeta Potential of an absolute value of at least 20 millivolts. In another aspect, our invention is a method of making an aqueous gel comprising adding to water 0.1% to 5%, by weight based on the water, cationic polymer and a lesser amount but at least 0.01% by weight of an anionic surfactant having from 8 to 22 carbon atoms, in the presence of 0.001% to 5% linear or branched alkyl alcohol of the general formula $C_MH_{2M+2-N}(OH)_N$, where M is a number from 6–23, and N is 1 when M is 6–12, but where M is 13–23, N may be a number from 1 to 3, and optionally in the presence of at least one of (a) up to 5% by weight amphoteric surfactant and (b) up to 5% by weight amine oxide, the ratio of the cationic polymer to the anionic surfactant being effective to provide a Zeta Potential having an absolute value of at least 20 millivolts. Further, our invention includes an aqueous gel comprising a polymer in an amount no greater than 1% by weight in water, characterized by a "10/100 20/40" settling rate result at 60 minutes of no more than 8 millimeters, preferably no more than 7 millimeters. Stated another way, our invention includes an aqueous gel comprising no more than 1%, preferably no more than 0.7%, water soluble polymer, the gel having a zero shear viscosity of at least 45,000 following the zero shear viscosity extrapolation procedure of Asadi, Conway and Barree in SPE 73755 or, expressed another way, characterized by a "10/100 20/40" settling rate result at 60 minutes of no more than 8 millimeters, preferably no more than 7 millimeters.

The invention claimed is:

1. An aqueous composition useful for conserving energy in the transportation of aqueous fluids through pipes, comprising:
   water and, by weight based on the water, a gel, comprising:
   (a) 0.1% to 5% of an anionic or cationic polymer,
   (b) a lesser amount but at least 0.01 % of a surfactant having from 8 to 22 carbon atoms and a charge opposite that of said polymer,
   (c) from 0.001 to 5% of a hydrophobic alcohol,
   (d) up to 5% of an amphoteric surfactant, and
   (e) up to 5% of an amine oxide, said gel having a Zeta Potential of an absolute value of at least 20 millivolts, and at least 0.0001% water soluble nonionic friction reducer.

2. Composition of claim 1 wherein said water soluble nonionic friction reducer is polyethylene oxide.

3. Composition of claim 1 wherein said hydrophobic alcohol is a linear or branched alkyl alcohol of the general formula $C_MH_{2M+2-N}(OH)_N$, where M is a number from 6–23, and N is 1 when M is 6–12, but where M is 13–23, N may be a number from 1 to 3.

4. Composition of claim 2 wherein said polyethylene oxide has a molecular weight of at least 10,000.

5. Composition of claim 1 wherein said water soluble nonionic friction reducer is a polyalkylene glycol having a molecular weight of at least 1000.

6. Composition of claim 1 wherein said anionic or cationic polymer (a) is poly (diallyl dimethyl ammonium chloride).

7. Composition of claim 1 wherein said anionic or cationic polymer (a) is a cationic polymer and said hydrophobic alcohol is a linear or branched alkyl alcohol of the general formula $C_MH_{2M+2-N}(OH)N$, where M is a number from 6–23, and N is 1 when M is 6–12, but where M is 13–23, N may be a number from 1 to 3.

8. Composition of claim 1 wherein said anionic surfactant comprises sodium lauryl sulfonate.

9. Composition useful for friction reduction in aqueous systems, comprising:
   a coacervate gel, comprising:
     a cationic or anionic polymer;
     a lesser amount of an oppositely charged surfactant, in a ratio to provide a Zeta Potential of an absolute value of at least 20 millivolts, and
     from 0.001% to 5% by weight of a hydrophobic alcohol having 6 to 23 carbon atoms, and
   a nonionic water soluble friction reducer, the nonionic water soluble friction reducer being present in a weight ratio to the anionic or cationic polymer of 0.001:1 to 5:1.

10. The composition of claim 9, wherein the anionic or cationic polymer comprises a cationic polymer and the hydrophobic alcohol is a linear or branched alkyl alcohol of the general formula $C_MH_{2M+2-N}(OH)_N$, where M is a number from 6–23, and N is 1 when M is 6–12, but where M is 13–23, N may be a number from 1 to 3.

11. The composition of claim 10, wherein the surfactant comprises sodium lauryl sulfonate.

12. The composition of claim 11, wherein the cationic polymer comprises a poly (diallyl dimethyl ammonium chloride).

13. The composition of claim 9, wherein the friction reducer comprises a water soluble polymer having a molecular weight of at least 1000.

14. The composition of claim 9, further comprising up to 5% of an amphoteric surfactant.

15. The composition of claim 9, further comprising up to 5% of an amine oxide.

16. The composition of claim 9, wherein said friction reducer is polyethylene oxide.

17. The composition of claim 16, wherein said polyethylene oxide has a molecular weight of at least 10,000.

18. The composition of claim 9, wherein the hydrophobic alcohol comprises a linear or branched alkyl alcohol of the general formula $C_MH_{2M+2-N}(OH)_N$, where M is a number from 6–23, and N is 1 when M is 6–12, but where M is 13–23, N may be a number from 1 to 3.

19. The composition of claim 9, wherein friction reducer comprises a polyalkylene glycol having a molecular weight of at least 1000.

20. A method of conserving energy in the transportation of aqueous fluid through a pipe comprising adding to the aqueous fluid a small amount of a composition of claim 9.

21. The method of claim 20, wherein the pipe is in a well and the aqueous fluid comprises a fracturing fluid.

22. The method of claim 21, wherein the fracturing fluid includes a proppant.

23. The method of claim 22, wherein flow of the fracturing fluid is laminar flow.

24. The method of claim 22, further comprising up to 5% of an amphoteric surfactant.

25. The method of claim 22, further comprising up to 5% of an amine oxide.

26. The composition of claim 9, wherein the friction reducer comprises natural gums, modified gums, or polyalkylene glycols.

27. The composition of claim 9, wherein
 a. the polymer comprises polyDADMAC;
 b. the surfactant comprises sodium lauryl sulfonate; and
 c. the friction reducer comprises polyethylene oxide polymer.

28. The composition of claim 1, wherein
 a. the polymer comprises polyDADMAC;
 b. the surfactant comprises sodium lauryl sulfonate; and
 c. the friction reducer comprises polyethylene oxide polymer.

29. A method of conserving energy in the transportation of aqueous fluids through a pipe comprising adding to the aqueous fluids a small amount of a composition of claim 1.

30. The method of claim 29, wherein the pipe is in a well and the aqueous fluids comprises a fracturing fluid.

31. The method of claim 30, wherein the fracturing fluid includes a proppant.

* * * * *

UNITED STATES PATENT AND TRADEMARK OFFICE
CERTIFICATE OF CORRECTION

PATENT NO. : 7,205,262 B2  Page 1 of 1
APPLICATION NO. : 10/315374
DATED : April 17, 2007
INVENTOR(S) : Kevin N. Schwartz and Kevin W. Smith It is certified that error appears in the above-identified patent and that said Letters Patent is hereby corrected as shown below:

On the title page:

In Section (73), Assignee, please delete "Weatherford/Lamb, Inc." and insert --Clearwater International, LLC--.

Signed and Sealed this

Fourth Day of September, 2007

JON W. DUDAS
*Director of the United States Patent and Trademark Office*